US010031213B2

(12) United States Patent
Mushimoto et al.

(10) Patent No.: US 10,031,213 B2
(45) Date of Patent: Jul. 24, 2018

(54) LASER SCANNER

(71) Applicants: FUNAI ELECTRIC CO., LTD., Osaka (JP); Kyoto University, Kyoto (JP)

(72) Inventors: Atsushi Mushimoto, Daito (JP); Ryusuke Horibe, Hirakata (JP); Manabu Murayama, Itami (JP); Yuichiro Masuda, Takatsuki (JP); Tomohisa Hirai, Osaka (JP); Shingo Setono, Ikoma (JP); Fumitoshi Matsuno, Kyoto (JP)

(73) Assignees: FUNAI ELECTRIC CO., LTD., Osaka (JP); KYOTO UNIVERSITY, Kyoto (JP)

( * ) Notice: Subject to any disclaimer, the term of this patent is extended or adjusted under 35 U.S.C. 154(b) by 401 days.

(21) Appl. No.: 14/798,508

(22) Filed: Jul. 14, 2015

(65) Prior Publication Data

US 2016/0011311 A1   Jan. 14, 2016

(30) Foreign Application Priority Data

Jul. 14, 2014 (JP) ................................ 2014-144212
Jul. 14, 2014 (JP) ................................ 2014-144295

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4812* (2013.01); *G01S 17/42* (2013.01);
(Continued)

(58) Field of Classification Search
CPC .............. G02B 26/0816; G02B 26/105; G02B 27/108; G02B 27/143; G02B 5/09;
(Continued)

(56) References Cited

U.S. PATENT DOCUMENTS 5,808,727 A * 9/1998 Katayama ............. G01S 7/4811
356/141.1
7,199,914 B2   4/2007 Takeuchi et al.
(Continued)

FOREIGN PATENT DOCUMENTS

CA       1 341 295        9/2001
DE       199 63 895       2/2001
(Continued)

OTHER PUBLICATIONS

Extended European Search Report dated Nov. 18, 2015 in corresponding European Application No. 15176461.0.

*Primary Examiner* — Mark Hellner
(74) *Attorney, Agent, or Firm* — Wenderoth, Lind & Ponack, L.L.P.

(57) ABSTRACT

A laser scanner includes a light source, a scanning mirror, and a first photodetector. The scanning mirror includes: a first reflective surface reflects the laser light from the light source; and a second reflective surface that reflects, toward the photodetector, the laser light reflected from the target object. The first reflective surface and at least part of the second reflective surface are disposed at mutually different angles. When a first optical axis passing through the target object and the first reflective surface is parallel with a second optical axis passing through the target object and the second reflective surface, a third optical axis passing through the first reflective surface and the light source and a fourth optical axis passing through the second reflective surface and the photodetector are at a predetermined angle relative to one another.

17 Claims, 17 Drawing Sheets

(51) Int. Cl.
   *G02B 26/08*   (2006.01)
   *G02B 26/10*   (2006.01)
   *G06K 7/10*    (2006.01)
   *G01S 17/42*   (2006.01)
   *G02B 27/10*   (2006.01)
   *G02B 27/14*   (2006.01)
   *G02B 5/09*    (2006.01)

(52) U.S. Cl.
   CPC ....... *G02B 26/0816* (2013.01); *G02B 26/105* (2013.01); *G02B 27/108* (2013.01); *G02B 27/143* (2013.01); *G06K 7/10633* (2013.01); *G06K 7/10831* (2013.01); *G02B 5/09* (2013.01)

(58) Field of Classification Search
   CPC ............ G06K 7/10633; G06K 7/10831; G01S 7/4817; G01S 7/4812; G01S 17/42
   USPC ........................................................ 356/4.01
   See application file for complete search history.

(56) References Cited

U.S. PATENT DOCUMENTS

| | | | |
|---|---|---|---|
| 7,580,117 | B2 | 8/2009 | Okada et al. |
| 8,305,561 | B2* | 11/2012 | Mori ........................ G01C 3/08 356/28.5 |
| 2001/0012016 | A1 | 8/2001 | Ide et al. |
| 2001/0035946 | A1* | 11/2001 | Nakase ................ G01C 15/002 356/4.01 |
| 2006/0131486 | A1 | 6/2006 | Land |
| 2006/0158713 | A1 | 7/2006 | Takeuchi et al. |
| 2008/0130138 | A1 | 6/2008 | Katoh et al. |
| 2008/0158555 | A1* | 7/2008 | Mori ....................... G01S 7/481 356/239.2 |
| 2008/0316463 | A1 | 12/2008 | Okada et al. |
| 2011/0235018 | A1* | 9/2011 | Mori ........................ G01C 3/08 356/5.01 |
| 2012/0299764 | A1 | 11/2012 | Haneda et al. |

FOREIGN PATENT DOCUMENTS

| | | |
|---|---|---|
| EP | 0 553 698 | 8/1993 |
| EP | 1 562 055 | 8/2005 |
| GB | 2 354 361 | 3/2001 |
| JP | 56-134012 | 10/1981 |
| JP | 2006-201350 | 8/2006 |
| JP | 2008-008678 | 1/2008 |
| JP | 2008-216238 | 9/2008 |
| JP | 2008-233405 | 10/2008 |
| JP | 2009-048081 | 3/2009 |
| JP | 2009-216789 | 9/2009 |
| JP | 2012-181144 | 9/2012 |
| JP | 5056362 | 10/2012 |
| JP | 2013-210315 | 10/2013 |

\* cited by examiner

LASER SCANNER

CROSS REFERENCE TO RELATED APPLICATIONS

The present application is based on and claims priority of Japanese Patent Application No. 2014-144295 filed on Jul. 14, 2014 and Japanese Patent Application No. 2014-144212 filed on Jul. 14, 2014. The entire disclosures of the above-identified applications, including the specifications, drawings and claims are incorporated herein by reference in their entirety.

FIELD

The present invention relates to a laser scanner for scanning laser light toward a target object.

BACKGROUND

Laser scanners that scan laser light toward a target object are known (e.g., see Patent Literature (PTL) 1). Such laser scanners can measure the distance between the laser scanner and the target object by, for example, detecting laser light reflected back from the target object.

The conventional laser scanner according to PTL 1 includes, disposed along the optical axis of the laser light emitted from the light source, a mirror with an aperture and a scanning mirror. The mirror with the aperture is disposed between the light source and the scanning mirror. The aperture of this mirror is formed to allow the laser light emitted from the light source to pass through the mirror. A reflective surface is formed on the mirror with the aperture, on the side facing the scanning mirror. The scanning mirror, in contrast, scans the laser light emitted from the light source toward a target object, and oscillates about a predetermined axis.

The laser light emitted from the light source is reflected by the scanning mirror after passing through the mirror with the aperture. The oscillation of the scanning mirror scans the reflected laser light toward the target object. The laser light reflected from the target object is reflected by the scanning mirror, and then reflected by the reflective surface of the mirror with the aperture. The laser light is reflected from the reflective surface of the mirror with the aperture, condensed after passing through a condenser lens, and then received (detected) by a photodetector.

CITATION LIST

Patent Literature

[PTL 1] Japanese Unexamined Patent Application Publication No. 2012-181144
[PTL 2] Japanese Unexamined Patent Application Publication No. 2013-210315

SUMMARY

Technical Problem

However, with the conventional laser scanner described above, the mirror with the aperture and the scanning mirror are required to be provided as individual mirrors. As such, the number of optical components increases, and consequently the overall size of the laser scanner increases.

The present invention has been conceived to solve the problem described above, and has a first aim to provide a compact laser scanner.

Here, the scanning mirror only functions to scan the laser light, requiring a separate optical component for condensing the light reflected from the target object to be included in the laser scanner. Moreover, the light reflected from the target object is very faint. As such, in order to use this faint reflected light to measure the distance to the target object, the light emitted from the light source must be kept from reaching the photodetector.

Such a conventional laser scanner that includes a lens and a mirror with an aperture is known (e.g., see PTL 2). The lens is disposed along a path of the reflected light and condenses the reflected light, and the mirror with the aperture separates a path for light emitted from the light source from the path of the reflected light.

However, with such a configuration, increasing the surface area of the reflective surface of the scanning mirror as a means to increase the distance measurement accuracy of the laser scanner necessitates enlargement of optical components, such as the lens that condenses the reflected light. This undesirably increases the overall size of the laser scanner.

The present invention has been conceived to solve the problem described above, and has a second aim to provide a compact laser scanner with fewer optical components.

Solution to Problem

In order to achieve the above-described first aim, the first laser scanner according to one aspect of the present invention is for scanning laser light toward a target object and includes: a light source that emits laser light; a scanning mirror that scans the laser light from the light source toward the target object by oscillating about a predetermined axis, and reflects the laser light reflected from the target object; and a photodetector that receives, via the scanning mirror, the laser light reflected from the target object. The scanning mirror includes: a first reflective surface that scans the laser light from the light source by reflecting the laser light from the light source; and a second reflective surface that reflects, toward the photodetector, the laser light reflected from the target object. The first reflective surface and at least part of the second reflective surface are disposed at mutually different angles. When (i) a first optical axis passing through the target object and the first reflective surface is parallel with (ii) a second optical axis passing through the target object and the second reflective surface, (iii) a third optical axis passing through the first reflective surface and the light source and (iv) a fourth optical axis passing through the second reflective surface and the photodetector are at a predetermined angle relative to one another.

With this, since the first reflective surface and at least part of the second reflective surface are disposed at mutually different angles, the scanning mirror can separate a light path for the light transmitting system, which is the path of laser light from the light source, from a light path for the light receiving system, which is the path of laser light from the target object to the photodetector. This eliminates the need to provide a separate component for separating the light path for the light transmitting system from the light path for the light receiving system, such as a mirror with an aperture, in addition to the scanning mirror. As a result, the number of optical components used in the laser scanner is reduced, allowing for a more compact laser scanner. Moreover, separating the light path for the light transmitting system from the light path for the light receiving system makes placement of the light source and the photodetector more flexible.

For example, in the laser scanner according to one aspect of the present invention, the first optical axis and the second optical axis may be coincident.

For example, in the laser scanner according to one aspect of the present invention, in a plan view of the scanning mirror, a region defined by the first reflective surface may be included within a region defined by the second reflective surface.

For example, in the laser scanner according to one aspect of the present invention, the first reflective surface may be disposed along the predetermined axis.

With this configuration, since the first reflective surface is disposed along the predetermined axis of the scanning mirror, the amount of displacement of the scanning mirror with respect to the predetermined axis of the first reflective surface when the scanning mirror oscillates about the predetermined axis reduces. As a result, the surface area of the first reflective surface can be reduced. Thus, when the laser light emitted from the light source is highly directional, the surface area of the first reflective surface can be greatly minimized.

For example, in the laser scanner according to one aspect of the present invention, the scanning mirror may have an inner wall defining an opening through which the laser light from the light source passes, the laser light passing through from a first surface side of the scanning mirror to an opposing second surface side of the scanning mirror. The first reflective surface may be formed on the inner wall defining the opening, may reflect the laser light entering the opening from the light source, and may scan the reflected laser light out of the opening toward the target object. The second reflective surface may be formed on the second surface of the scanning mirror and reflect, toward the photodetector, the laser light reflected from the target object.

According to this aspect, the scanning mirror includes a first reflective surface and a second reflective surface. The first reflective surface scans laser light toward the target object by reflecting the laser light from the light source. The second reflective surface reflects, toward the photodetector, the laser light reflected from the target object. Thus, the scanning mirror has two functions, namely a function of scanning the laser light from the light source toward the target object (i.e., the function performed by the scanning mirror described in the Background section), and a function of reflecting, toward the photodetector, the laser light reflected from the target object (i.e., the function performed by the mirror with an aperture described in the Background section). As a result, since one scanning mirror can perform both of the above functions, the number of optical components in the laser scanner can be reduced, and a compact laser scanner can be realized.

For example, in the laser scanner according to one aspect of the present invention, the opening may be a notch extending from an edge of the scanning mirror, in a direction substantially perpendicular to a thickness direction of the scanning mirror, and the first reflective surface may be formed on the inner wall defining the notch, at a base of the notch.

According to this aspect, since the opening is a notch and the first reflective surface is formed on the inner wall of the scanning mirror defining the notch, at a base of the notch, the laser light from the light source can be projected on the scanning mirror inside the notch at a shallow angle relative to the extending direction of the notch. This makes it possible to keep the distance at which the light source and the scanning mirror are disposed from each other short.

For example, in the laser scanner according to one aspect of the present invention, the first reflective surface may be substantially perpendicular to the second reflective surface.

According to this aspect, since the first reflective surface is substantially perpendicular to the second reflective surface, the laser light from the light source can be projected on the scanning mirror inside the notch at an even shallower angle relative to the extending direction of the notch. This makes it possible to keep the distance at which the light source and the scanning mirror are disposed from each other even shorter.

For example, in the laser scanner according to one aspect of the present invention, the opening may be an aperture formed through the thickness of the scanning mirror, and the first reflective surface may be formed on the inner wall defining the aperture.

According to this aspect, since the opening is an aperture and the first reflective surface is formed on the inner wall of the scanning mirror defining the aperture, the surface area of the second reflective surface can be enlarged by reducing the area of the aperture on the second surface side of the scanning mirror.

For example, in the laser scanner according to one aspect of the present invention, the aperture may have an area on the first surface side of the scanning mirror that is greater than an area of the aperture on the second surface side of the scanning mirror.

According to this aspect, the surface area of the second reflective surface can be enlarged even more since the area of the aperture on the second surface side of the scanning mirror can be even further reduced.

For example, in the laser scanner according to one aspect of the present invention, the first reflective surface may be oblique to the second reflective surface.

According to this aspect, since the first reflective surface is oblique to the second reflective surface, the laser light from the light source can easily reach the first reflective surface.

For example, in the laser scanner according to one aspect of the present invention, the scanning mirror may include, on the first surface side, a low-reflection surface having a lower reflectivity than the first reflective surface and the second reflective surface.

According to this aspect, since the scanning mirror includes, on the first surface side thereof, a low-reflection surface having a lower reflectivity than the first reflective surface and the second reflective surface, even if the diameter of the laser light is greater than the side of the opening, the portion of the laser light from the light source that cannot pass through the opening is absorbed by the low-reflection surface of the scanning mirror. As a result, generation of undesired light can be inhibited, and the detection accuracy of the photodetector can be increased.

For example, in the laser scanner according to one aspect of the present invention, the opening may have a width that is greater than or equal to a diameter of the laser light from the light source.

According to this aspect, since the size of the opening is greater than or equal to the diameter of the laser light from the light source, scattering of a portion of the laser light from the light source on the first surface of the scanning mirror can be inhibited. Since this inhibits the attenuation of light due to mechanical vignetting and generation of undesired light, the detection accuracy of the first photodetector 12 can be increased.

In order to achieve the above-described second aim, with a second laser scanner according to one aspect of the present invention, the second reflective surface reflects and condenses, toward the photodetector, the laser light reflected from the target object.

According to this aspect, the laser light reflected from the target object is condensed onto the photodetector by the scanning mirror, and as such, no other optical component for condensing the laser light is required in addition to the scanning mirror. Moreover, the amount of light received can be increased by using a scanning mirror having a surface area larger than the surface area of the effective light receiving surface of the photodetector. With this, a compact laser scanner can be realized and the number of optical components can be reduced. Furthermore, by reducing the number of optical components used, unwanted light and stray light can be inhibited from generating in the laser scanner. As a result, the S/N ratio of the reflected light received by the photodetector can be increased, whereby the distance measurement accuracy can be increased.

For example, the first reflective surface may be disposed along an optical axis of the second reflective surface, and the first reflective surface may be oblique to a plane perpendicular to the optical axis of the second reflective surface.

Here, the optical axis of the laser light reflected to the target object and the optical axis of the reflected light reflected from the target object can be regarded as substantially coincidental. As such, the angle between the optical axis of the laser light emitted from the light source and the optical axis of the reflected light reflected toward the photodetector is double the angle of inclination of the first reflective surface relative to a plane perpendicular to the optical axis of the second reflective surface. As a result, the scanning mirror can separate the path of the laser light emitted from the light source and the path of the reflected light reflected toward the photodetector at an angle that is double the angle of inclination described above.

For example, the scanning mirror may include a concave mirror on which the second reflective surface is formed, and the second reflective surface may be concave.

For example, the scanning mirror may include a reflective component that reflects the laser light reflected from the target object and a lens component that is stacked on the reflective component, and transmits and condenses the laser light. The second reflective surface may be an interface between the reflective component and the lens component.

For example, the second reflective surface may surround the first reflective surface.

In this way, by forming the second reflective surface, which has a light condensing function, to surround the first reflective surface, the surface area of the surface that reflects the received laser light reflected from the target object, which is faint, scattered light, can be increased. As a result, the reflected laser light reflected from the target object can be received by a reflective surface having a sufficiently large surface area, and condensed to the photodetector, which allows the photodetector to obtain a signal having a good S/N ratio.

For example, the scanning mirror may have a substantially planar surface opposing the second reflective surface, the substantially planar surface being perpendicular to an optical axis of the second reflective surface, and the optical axis of the second reflective surface may intersect the predetermined axis.

Here, since the part of the scanning mirror on which the second reflective surface is formed has a light condensing function, the thickness varies in different parts. In other words, the mass of that part per unit area varies depending on distance from the optical axis of the second reflective surface. Thus, by having a configuration in which this optical axis intersects the axis of oscillation, the second mirror has left-right symmetry about the axis of oscillation J, thereby balancing the mass of the second mirror. As a result, the scanning mirror can easily be oscillated with resonance.

For example, the scanning mirror may include a protrusion that protrudes outward from the second reflective surface, and the first reflective surface may be at least part of a surface formed by the protrusion.

For example, in the laser scanner according to one aspect of the present invention, the center of mass of the scanning mirror may be disposed along the predetermined axis.

According to this aspect, the scanning mirror can be stably oscillated.

Advantageous Effects

With the first laser scanner according to one aspect of the present invention, a compact laser scanner can be achieved.

With the second laser scanner according to one aspect of the present invention, the number of optical components included in the laser scanner can be reduced and a compact laser scanner can be achieved.

BRIEF DESCRIPTION OF DRAWINGS

These and other objects, advantages and features of the invention will become apparent from the following description thereof taken in conjunction with the accompanying drawings that illustrate a specific embodiment of the present invention.

In FIG. 9, (a) is a top view, (b) is a cross sectional view taken at line C-C' in (a), and (c) is a cross sectional view taken at line D-D' in (a).

In FIG. 14, (a) is a top view, (b) is a cross sectional view taken at line E-E' in (a), and (c) is a cross sectional view taken at line F-F' in (a).

DESCRIPTION OF EMBODIMENT

Hereinafter, embodiments are described in greater detail with reference to the accompanying Drawings. Note that the Drawings are schematic drawings, and may not depict exact dimensions or dimensional ratios.

Each of the following embodiments describes a general or specific example. The numerical values, shapes, materials, structural components, and the arrangement and connection of the structural components etc., shown in the following embodiments are mere examples, and therefore do not limit the present invention, the scope of which is defined in the appended Claims. Therefore, among the structural components in the following embodiments, structural components not recited in any one of the independent claims are described as preferred structural components, and are not absolutely necessary to overcome the problem according to the present invention.

Embodiment 1

Overall Configuration of Laser Scanner

Figure 1:
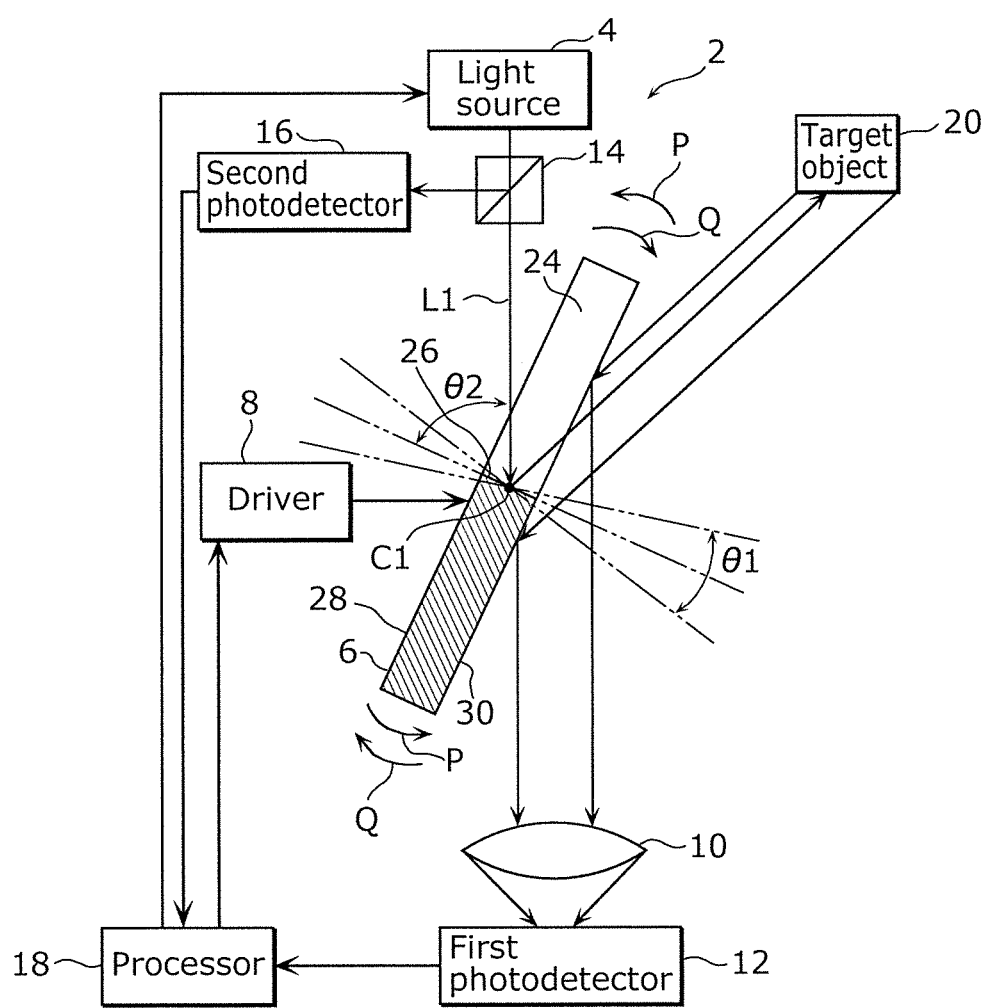
FIG. 1 is a schematic view of a configuration of a laser scanner according to Embodiment 1.

First, the overall configuration of the laser scanner 2 according to Embodiment 1 will be described with reference to FIG. 1. FIG. 1 is a schematic view of the configuration of the laser scanner according to Embodiment 1.

As illustrated in FIG. 1, the laser scanner 2 according to Embodiment 1 includes a light source 4, a scanning mirror 6, an driver 8, a condenser lens 10, a first photodetector 12 (one example of the photodetector), a beam splitter 14, a second photodetector 16, and a processor 18. Note that the laser scanner 2 is a device for scanning laser light toward the target object 20, and is applicable as, for example, a laser rangefinder (LRF) for measuring the distance between the laser scanner 2 and the target object 20.

The light source 4 is, for example, a laser diode. The light source 4 emits laser light toward the scanning mirror 6 based on a modulated signal outputted from the processor 18.

The scanning mirror 6 is, for example, a micro-electromechanical systems (MEMS) mirror that is oscillated about a predetermined axis C1 by an actuator (not shown in the Drawings). Note that, in FIG. 1, axis C1 extends perpendicular to the plane defined by the sheet of the drawing. The scanning mirror 6 has a function of scanning laser light, from the light source 4, along a single axis (e.g., the horizontal axis) toward the target object 20, by oscillating about the axis C1. The scanning mirror 6 also has a function of reflecting, toward the first photodetector 12, laser light reflected from target object 20. Note that FIG. 1 illustrates a cross section of the scanning mirror 6 taken at line A-A in FIG. 2A (to be described later). The laser scanner 2 according to Embodiment 1 is characterized by the structure of the scanning mirror 6, which will be described later.

The driver 8 generates drive current for driving the scanning mirror 6, based on a drive signal outputted from the processor 18. The driver 8 outputs the generated drive current to the actuator. With this, the actuator oscillates the scanning mirror 6 about the axis C1.

The condenser lens 10 is disposed between the scanning mirror 6 and the first photodetector 12. The laser light reflected from the second reflective surface 30 (to be described later) of the scanning mirror 6 is condensed on the sensor surface (not shown in the Drawings) of the first photodetector 12 by the condenser lens 10.

The first photodetector 12 is, for example, a photodiode. The laser light reflected from the target object 20 is received by the first photodetector 12 via the scanning mirror 6 and the condenser lens 10. The first photodetector 12 outputs, to the processor 18, a photodetection signal indicating an amount of received laser light, based on an amount of laser light received by the first photodetector 12.

The beam splitter 14 is disposed between the light source 4 and the scanning mirror 6. Among the laser light reflected from the target object 20, laser light subsequently reflected from the first reflective surface 26 (to be described later) of the scanning mirror 6 is guided to the second photodetector 16 by the beam splitter 14.

The second photodetector 16 is, for example, a photodiode. The second photodetector 16 receives laser light guided by the beam splitter 14. The second photodetector 16 outputs, to the processor 18, a photodetection signal indicating an amount of received laser light, based on an amount of laser light received by the first photodetector 12.

The processor 18 includes, for example, a system large-scale integrated (system LSI) circuit, an integrated circuit (IC), or a microcontroller. The processor 18 outputs a modulated signal to the light source 4 and outputs a drive signal to the driver 8.

Furthermore, the processor 18 calculates the distance between the laser scanner 2 and the target object 20 based on a phase difference between the laser light emitted from the light source 4 and the laser light received by the first photodetector 12. More specifically, the processor 18 calculates a phase difference based on the generated modulated signal and the photodetection signal output by the first photodetector 12, and using the calculated phase difference, calculates an elapse of time from when laser light is emitted from the light source 4 until the laser light is received by the first photodetector 12. The processor 18 then calculates the distance by multiplying half the calculated time by the speed of light. Moreover, the processor 18 processes the photodetection signal output by the second photodetector 16 as required.

Scanning Mirror Structure

Figure 2A:
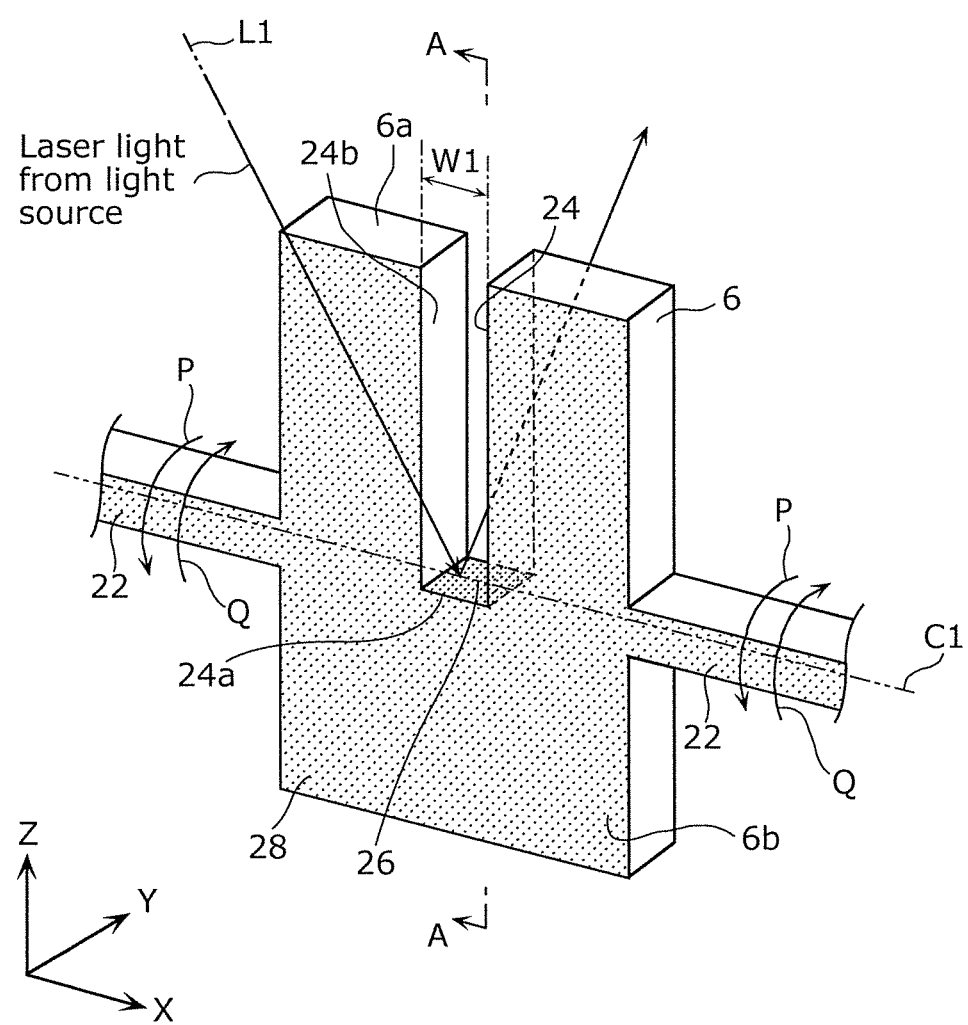
FIG. 2A is a perspective view of a first surface side of a scanning mirror according to Embodiment 1.
Figure 2B:
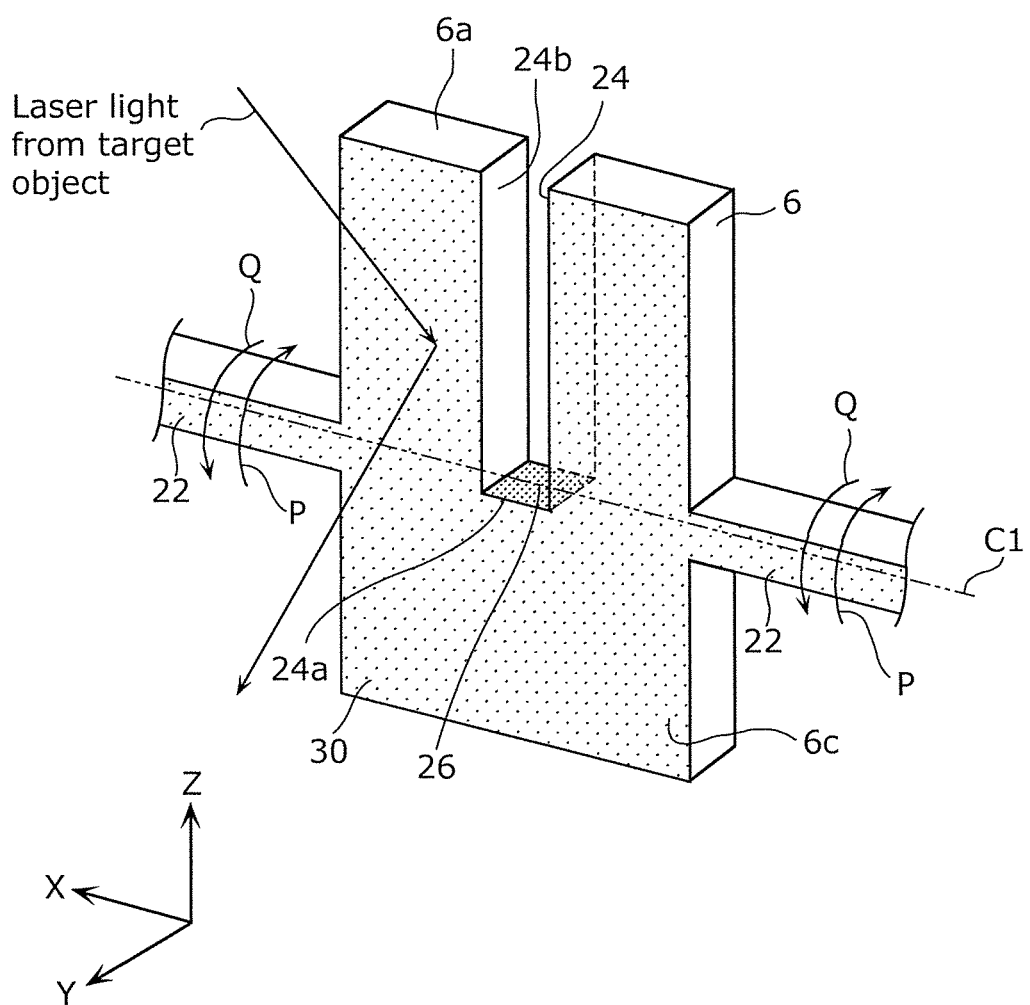
FIG. 2B is a perspective view of a second surface side of a scanning mirror according to Embodiment 1.

Next, the structure of the scanning mirror 6 will be described with reference to FIG. 1 through FIG. 2B. FIG. 2A is a perspective view of the first surface side of the scanning mirror according to Embodiment 1. FIG. 2B is a perspective view of the second surface side of the scanning mirror according to Embodiment 1.

As illustrated in FIG. 2A and FIG. 2B, the scanning mirror 6 has, for example, a rectangular, plate-like shape. A pair of torsion bars 22 extend along the axis C1 from the edge 6a of scanning mirror 6. The scanning mirror 6 is connected to the actuator via the pair of torsion bars 22. With this, as indicated by arrows P and Q in FIG. 1 through FIG. 2B, the actuator oscillates the scanning mirror 6 at an angle of oscillation θ1 about the axis C1.

The rectangular shape of the scanning mirror 6 makes the scanning mirror 6 easier to manufacture and allows for effective utilization of the surface area of the scanning mirror 6, which increases the cost benefit of the scanning mirror 6. Note that the shape of the scanning mirror 6 is not limited to a rectangular shape. For example, the scanning mirror 6 may have a different polygonal shape, a circular shape, or an elliptical shape. Regarding the shape of the scanning mirror 6, it is preferable that the axis C1 be coincident with the central axis of the pair of torsion bars 22 and that the center of mass of the scanning mirror 6 be disposed along the central axis of the pair of torsion bars 22. Further regarding the shape of the scanning mirror 6, the axis C1 more preferably passes through the center of the first reflective surface 26 (to be described later) and the center of mass of the scanning mirror 6 is more preferably located at the center of the first reflective surface 26.

As illustrated in FIG. 2A and FIG. 2B, the scanning mirror 6 has a notch 24 (one example of the opening). The notch 24 has an elongated rectangular shape, and extends in a straight line from the edge 6a of the scanning mirror 6 in a direction substantially perpendicular (z axis direction) to the thickness direction (Y axis direction) of the scanning mirror 6. The first reflective surface 26, which is for reflecting the laser light, is formed at the base 24a of the notch 24, on an inner wall 24b of the notch 24. The first reflective surface 26 is disposed along the optical axis L1 of the laser light emitted from the light source 4, and disposed along the axis C1 (here, disposed "along the axis C1" includes positions in a vicinity of the axis C1). Moreover, as illustrated in FIG. 1, the first reflective surface 26 is inclined at a predetermined angle $\theta 2$ ($0° < \theta 2 < 90°$) relative to the optical axis L1. The width W1 of the notch 24 (in the X axis direction) is greater than or equal to the diameter of the laser light incident on the first reflective surface 26 from the light source 4. Note that for illustrative purposes, in FIG. 2A and FIG. 2B, the region defined by the first reflective surface 26 is shaded.

As illustrated in FIG. 2A, a low-reflection surface 28 is formed on the first surface 6b of the scanning mirror 6. The low-reflection surface 28 is, for example, a surface that has been coated black. The reflectivity of the low-reflection surface 28 is lower than the reflectivity of the first reflective surface 26 and the reflectivity of a second reflective surface 30 (to be described later). Note that for illustrative purposes, in FIG. 2A, the region defined by the low-reflection surface 28 is shaded.

As illustrated in FIG. 2B, the second reflective surface 30, which is for reflecting the laser light, is formed on roughly the entire second surface 6c (the surface opposite the first surface 6b) of the scanning mirror 6. The second reflective surface 30 is substantially perpendicular to the first reflective surface 26. Moreover, the second reflective surface 30 is disposed so as to face the target object 20. Note that for illustrative purposes, in FIG. 2B, the region defined by the second reflective surface 30 is shaded.

In this way, the first reflective surface 26 and at least part of the second reflective surface 30 are disposed at mutually different angles. More specifically, in Embodiment 1, the entire second reflective surface 30 is substantially perpendicular to the first reflective surface 26.

Scanning Mirror Operation

Figure 3A:
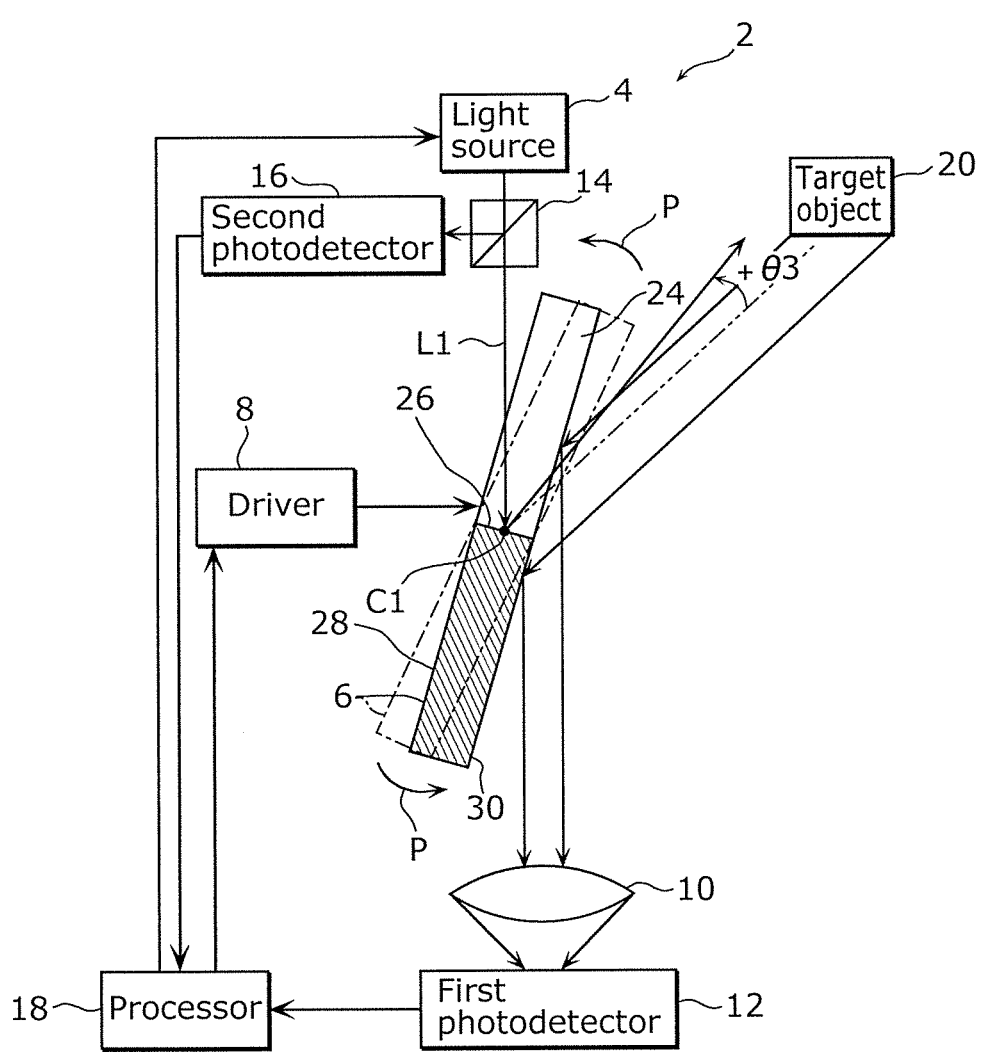
FIG. 3A is a schematic view of a laser scanner after the scanning mirror has oscillated from the position illustrated in FIG. 1.
Figure 3B:
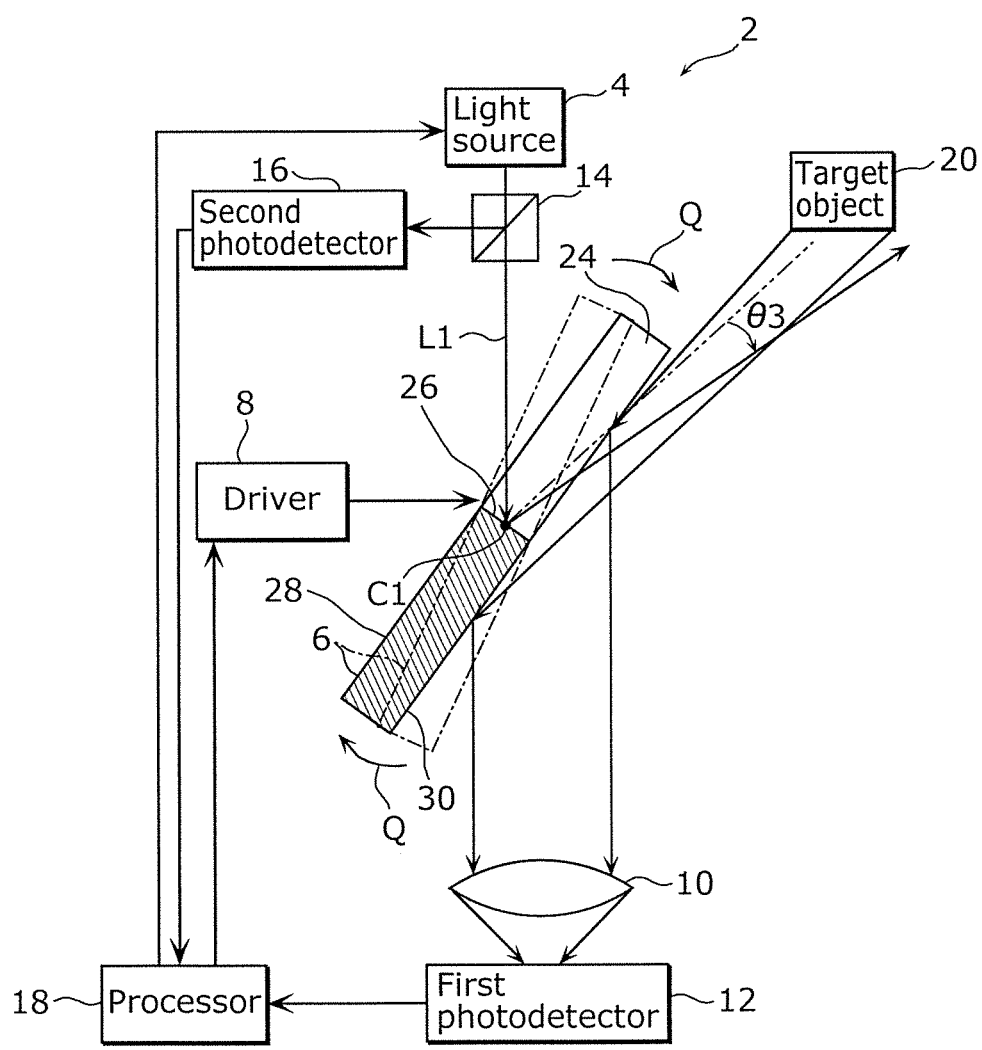
FIG. 3B is a schematic view of a laser scanner after the scanning mirror has oscillated from the position illustrated in FIG. 1.

Next, how the scanning mirror 6 operates will be described with reference to FIG. 1 through FIG. 3B. FIG. 3A and FIG. 3B are each schematic views of the laser scanner after the scanning mirror has oscillated from the position illustrated in FIG. 1.

As illustrated in FIG. 1 and FIG. 2A, the laser light emitted from the light source 4 is reflected by the first reflective surface 26 after entering the notch 24 of the scanning mirror 6. Here, since the first reflective surface 26 is oblique to the optical axis L1 of the laser light as described above, the first reflective surface 26 reflects the laser light out of the notch 24 and toward the target object 20. As indicated by arrows P and Q in FIG. 1, the scanning mirror 6 oscillates at angle of oscillation $\theta 1$ about the axis C1 to scan the laser light reflected off the first reflective surface 26 toward the target object 20 within a scanning angle range of $-\theta 3$ to $+\theta 3$.

As illustrated in FIG. 3A, when the scanning mirror 6 oscillates in the direction indicated by arrow P from the position illustrated in FIG. 1, the laser light reflected off first reflective surface 26 travels toward the target object 20 at a scanning angle of $+\theta 3$. Conversely, as illustrated in FIG. 3B, when the scanning mirror 6 oscillates in the direction indicated by arrow Q from the position illustrated in FIG. 1, the laser light reflected off first reflective surface 26 travels toward the target object 20 at a scanning angle of $-\theta 3$.

As illustrated in FIG. 1 and FIG. 2B, a portion of the laser light reflected from target object 20 is subsequently reflected by the second reflective surface 30 of the scanning mirror 6. As illustrated in FIG. 1, FIG. 3A, and FIG. 3B, the laser light reflected from the second reflective surface 30 is received by the first photodetector 12 via the condenser lens 10. Note that a portion of other laser light reflected from the target object 20 is then reflected from the first reflective surface 26 of the scanning mirror 6 and received by the second photodetector 16 via the beam splitter 14.

Advantageous Effect

Next, the advantageous effects of the laser scanner 2 according to Embodiment 1 will be described. As described above, the scanning mirror 6 includes two reflective surfaces—the first reflective surface 26 and the second reflective surface 30. The laser light emitted from the light source 4 is then reflected toward the target object 20 by the first reflective surface 26. The laser light reflected from the target object 20 is reflected toward the first photodetector 12 by the second reflective surface 30. Thus, the scanning mirror 6 has two functions. One function is to scan laser light received from the light source 4 toward the target object 20 (i.e., the function performed by the scanning mirror described in the Background of the Description), and the other function is to reflect, toward the first photodetector 12, laser light reflected from the target object 20 (i.e., the function performed by the mirror with the aperture described in the Background of the Description). As a result, since one scanning mirror 6 can perform both of the above functions, the number of optical components in the laser scanner 2 can be reduced, and a compact laser scanner 2 can be realized.

In other words, according to Embodiment 1, by disposing the first reflective surface 26 and the second reflective surface 30 at mutually different angles, the light path for the light transmitting system, which is the path of laser light from the light source 4, and the light path for the light receiving system, which is the path of laser light from the target object 20 to the first photodetector 12, can be separated. This makes it possible to separate the light path for the light transmitting system from the light path for the light receiving system without a separate component to perform the function of separating, such as a mirror with an aperture, in addition to the scanning mirror 6. As a result, the number of optical components used in the laser scanner 2 is reduced, allowing for a more compact laser scanner 2. Moreover, separating the light path for the light transmitting system from the light path for the light receiving system makes placement of the light source 4 and the first photodetector 12 more flexible.

More specifically, according to Embodiment 1, since the first reflective surface 26 and the second reflective surface 30 are disposed at mutually different angles, the optical axis of emitted light between the light source 4 and the scanning mirror 6 and the optical axis of reception light between the first photodetector 12 and the scanning mirror 6 can be made to be different, regardless of whether the optical axes of irradiating light and reflected light between the target object 20 and the scanning mirror 6 are coincident.

With laser scanners, the amount of reflected light is typically greatest when the target object is disposed along the optical axis of the irradiating light. Thus, in order to increase the measurement accuracy of the laser scanner, superimposing the optical axis of the irradiating light and the optical axis of the reflected light (i.e., making them coincident) is critical. However, when these two optical axes are superimposed, the irradiating light and the reflected light reflect off the scanning mirror at the same point, whereby the axes of the emitted light and the reception light become coincident. Thus, undesirably, the positions of the light source and the first photodetector interfere with each other.

However, although the irradiating light traveling toward the target object is a single beam, the reflected light from the target object is scattered light. Thus, the spot diameter of the scattered reflected light is greater than the spot diameter of the irradiating light.

The inventors of the present invention focused attention on this point, and designed the scanning mirror 6 such that the first reflective surface 26 is disposed on part of part of the scanning mirror 6 and inclined at a predetermined angle with respect to the second reflective surface 30. With this configuration, light reach the target object 20 from the light source 4 after reflecting off the first reflective surface 26, but reflected light from the target object 20 is reflected off both the first reflective surface 26 and the second reflective surface 30 since it is scattered light. Thus, the angle between the optical axis of the emitted light and the optical axis of the reception light is twice that of said predetermined angle. As a result, the light source 4 and the first photodetector 12 can be positioned without interfering with each other, making placement more flexible.

Moreover, in Embodiment 1, disposing the first reflective surface 26 and the second reflective surface 30 at mutually different angles yields the following relationships. When a first optical axis passing through the target object 20 and the first reflective surface 26 and a second optical axis passing through the target object 20 and the second reflective surface 30 are parallel, a third optical axis passing through the first reflective surface 26 and the light source 4 and a fourth optical axis passing through the second reflective surface 30 and the photodetector (here, the first photodetector 12) are at a predetermined angle relative to one another (twice the angle between first reflective surface 26 and second reflective surface 30).

Here, the first optical axis is the optical axis of laser light from the light source 4 after reflecting off the first reflective surface 26 and reaching the target object 20. The second optical axis is the optical axis of laser light from the light source 4 after reflecting off the target object 20 (i.e., reflected light) and reaching the second reflective surface 30. The third optical axis is the optical axis of laser light emitted from the light source 4 and reaching the first reflective surface 26. The fourth optical axis is the optical axis of laser light from the light source 4 after reflecting off the first reflective surface 26, the target object 20, and the second reflective surface 30, and reaching the first photodetector 12.

Since the amount of light from the light source incident on the scanning mirror is substantially greater than the amount of light received by the photodetector, laser scanners generally include a shield that blocks light from the light source from reaching the photodetector.

In contrast, in Embodiment 1, since the first reflective surface 26 and the second reflective surface 30 are disposed at mutually different angles, the third optical axis and the fourth optical axis can be separated regardless of whether the first optical axis and the second optical axis are parallel (here, regardless of whether they are coincident). Thus, even without a shield, laser light emitted from the light source 4 can be inhibited from reaching the first photodetector 12.

Embodiment 1 achieves the following advantageous effects in particular due to the first optical axis and the second optical axis are coincident.

For example, when the scanning mirror is separated into two vertically arranged mirrors with the first reflective surface formed on one mirror and the second reflective surface formed on the other, the first optical axis and the second optical axis can be parallel, but they are positioned apart in the vertical direction. In this case, when the target object is positioned closely, the amount of reflected light reaching the second reflective surface from the target object undesirably decreases, whereby the distance measurement accuracy diminishes.

Conversely, with Embodiment 1, as a result of the first optical axis, which passes through the target object 20 and the first reflective surface 26, and the second optical axis, which passes through the target object 20 second reflective surface 30, being coincident, the amount of reflected light reaching the second reflective surface 30 from the target object 20 is maximized. In other words, since a reduction in the amount of reflected light reaching the second reflective surface 30 from the target object 20 can be inhibited even when the target object 20 is closely positioned, a reduction in distance measurement accuracy can be inhibited. Thus, with Embodiment 1, even without a shield, laser light emitted from the light source 4 can be inhibited from reaching the first photodetector 12, thereby increasing distance measurement accuracy.

Furthermore, as described above, the first reflective surface 26 is disposed along the axis C1 of the scanning mirror 6. With this, since the amount of displacement of the first reflective surface 26 with respect to the axis C1 is small when the scanning mirror 6 oscillates about the axis C1, misalignment of laser light reflected by the first reflective surface 26 can be minimized. As a result, the width W1 of the notch 24 can be kept small, thereby effectively increasing the surface area of the second reflective surface 30.

Furthermore, as described above, the laser light emitted from the light source 4 enters the notch 24 at a shallow angle with respect to the direction in which the notch 24 extends (the Z axis direction). With this, the gap between the light source 4 and the scanning mirror 6 (in FIG. 1, the horizontal gap between the light source 4 and the scanning mirror 6) can be kept small, making it possible to achieve a more compact laser scanner 2.

Generally, the laser light reflected from the target object 20 is weaker than the laser light emitted directly from the light source 4. Consequently, when undesired light is generated in the vicinity of the scanning mirror 6, this undesired light reduces the detection accuracy of the first photodetector 12. As described above, in the laser scanner 2 according to Embodiment 1, since the width W1 of the notch 24 is greater than or equal to the diameter of the laser light, laser light emitted from the light source 4 can be inhibited from scattering on the first surface 6b of the scanning mirror 6. Since this inhibits the attenuation of light due to mechanical vignetting and generation of undesired light, the detection accuracy of the first photodetector 12 can be increased.

Note that, as described above, the low-reflection surface 28 is formed on the first surface 6b of the scanning mirror 6. With this, even when the diameter of the laser light is greater than the width W1 of the notch 24, the portion of the laser light emitted from light source 4 that cannot pass through the notch 24 is absorbed by the low-reflection surface 28 of the scanning mirror 6, and generation of undesired light can be inhibited.

Embodiment 2

Figure 4:
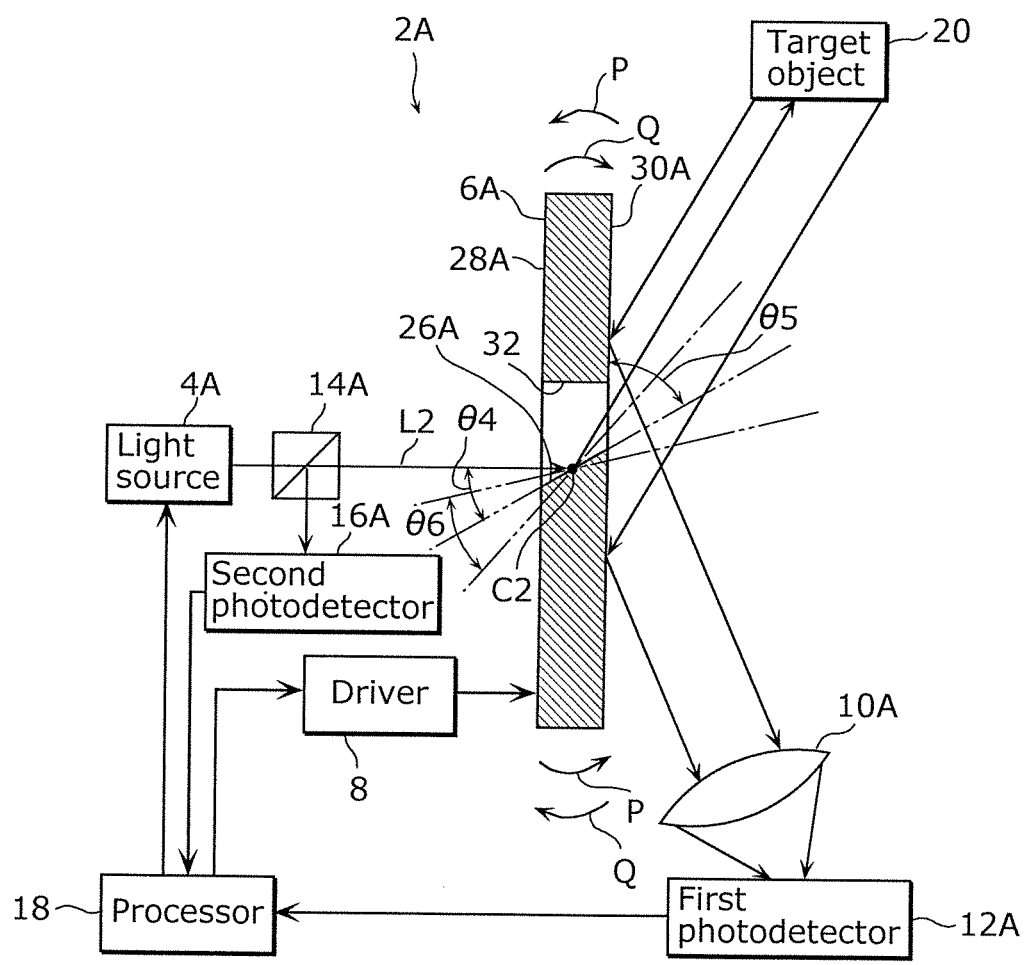
FIG. 4 is a schematic view of a configuration of a laser scanner according to Embodiment 2.
Figure 5A:
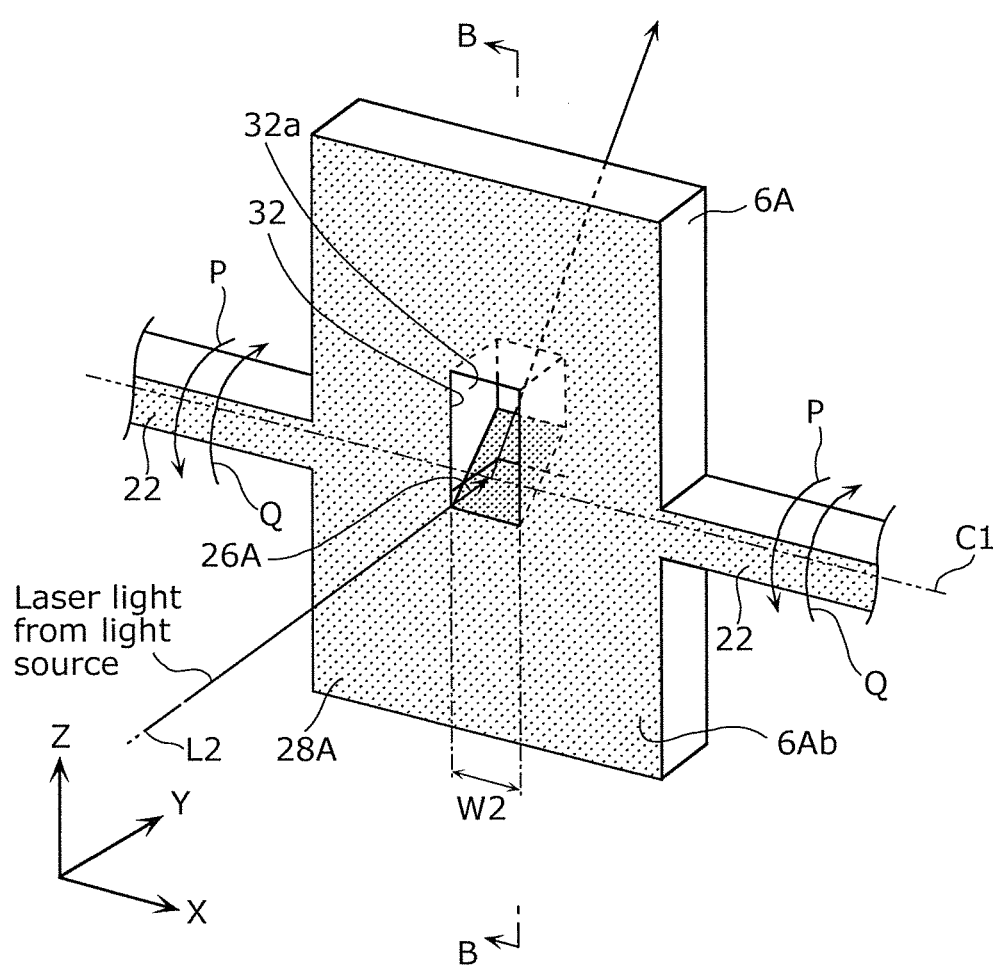
FIG. 5A is a perspective view of a first surface side of a scanning mirror according to Embodiment 2.
Figure 5B:
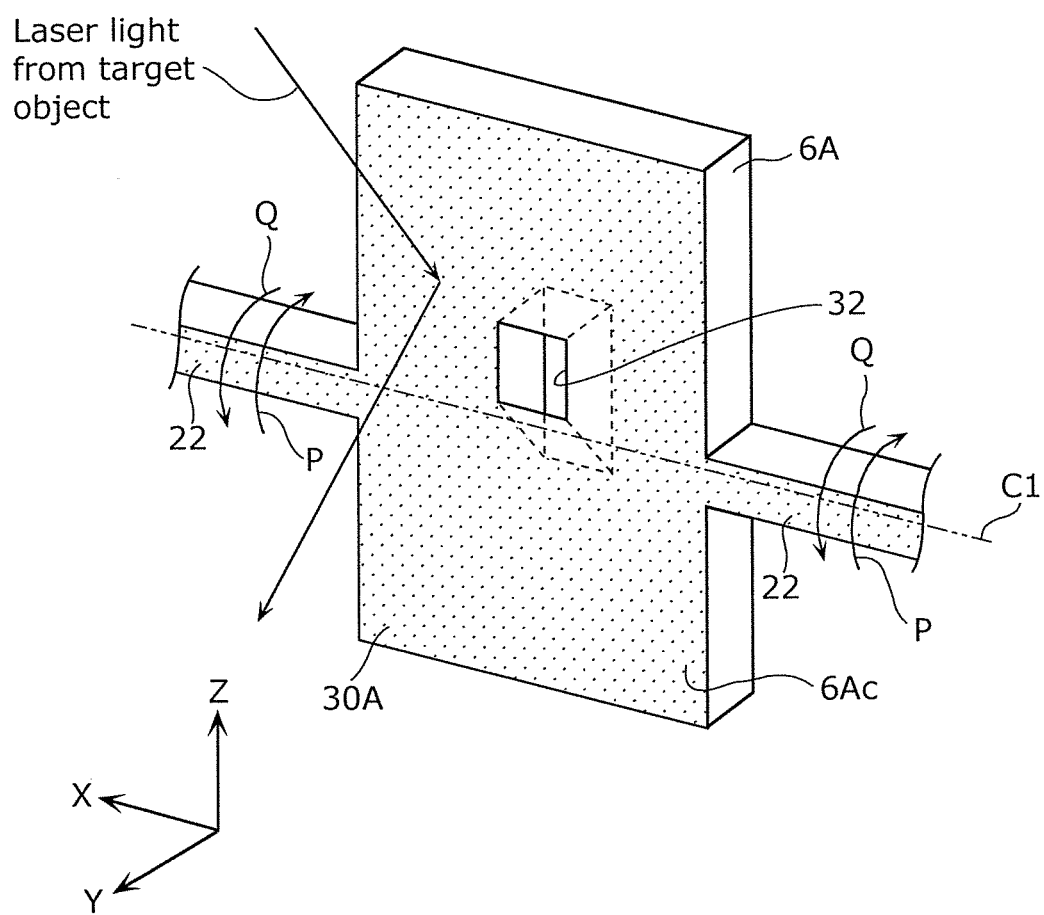
FIG. 5B is a perspective view of a second surface side of a scanning mirror according to Embodiment 2.

Next, the configuration of the laser scanner 2A according to Embodiment 2 will be described with reference to FIG. 4 through FIG. 5B. FIG. 4 is a schematic view of the configuration of the laser scanner according to Embodiment 2. FIG. 5A is a perspective view of the first surface side of the scanning mirror according to Embodiment 2. FIG. 5B is a perspective view of the second surface side of the scanning mirror according to Embodiment 2. Note that in Embodiment 2, structural components that are the same as in Embodiment 1 share like reference numbers, and description of such structural components is omitted.

Scanning Mirror Structure

The structure of the scanning mirror 6A in the laser scanner 2A according to Embodiment 2 differs from the structure of the scanning mirror 6 according to Embodiment 1. Accordingly, as illustrated in FIG. 4, in the laser scanner 2A according to Embodiment 2, the light source 4A, the scanning mirror 6A, the condenser lens 10A, the first photodetector 12A, the beam splitter 14A, and the second photodetector 16A differ from their equivalent counterparts in Embodiment 1. Note that FIG. 4 illustrates a cross section of the scanning mirror 6A taken at line B-B in FIG. 5A (to be described later).

As illustrated in FIG. 4 through FIG. 5B, the scanning mirror 6A has an aperture 32 (one example of the opening). The aperture 32 is a through-hole passing through the thickness of the scanning mirror 6A (i.e., passing through the scanning mirror 6A in the Y axis direction). The aperture 32 has a rectangular cross section. The area of the aperture 32 gradually decreases from the first surface 6Ab side of the scanning mirror 6A to the second surface 6Ac side of the scanning mirror 6A.

As illustrated in FIG. 5A, the first reflective surface 26A is formed on the inner wall 32a of the scanning mirror 6A defining the aperture 32. The first reflective surface 26A is disposed along the optical axis L2 of the laser light emitted from the light source 4A, and disposed along the axis C2 (here, disposed "along the axis C2" includes positions in a vicinity of the axis C2). Moreover, as illustrated in FIG. 4, the first reflective surface 26A is inclined at a predetermined angle θ4 (0°<θ4<90°) relative to the optical axis L2. The width W2 of the aperture 32 (in the X axis direction) is greater than or equal to the diameter of the laser light incident on the first reflective surface 26A from the light source 4A. Note that for illustrative purposes, in FIG. 5A, the region defined by the first reflective surface 26A is shaded.

As illustrated in FIG. 5A, a low-reflection surface 28A is formed on the first surface 6Ab of the scanning mirror 6A by, for example, patterning the first surface 6Ab with a texture.

The reflectivity of the low-reflection surface 28A is lower than the reflectivity of the first reflective surface 26A and the reflectivity of a second reflective surface 30A (to be described later). Note that for illustrative purposes, in FIG. 5A, the region defined by the low-reflection surface 28A is shaded.

As illustrated in FIG. 5B, the second reflective surface 30A is formed on roughly the entire second surface 6Ac of the scanning mirror 6A. As illustrated in FIG. 4, the second reflective surface 30A is inclined at a predetermined angle θ5 (0°<θ4<90°) relative to the first reflective surface 26A. Note that for illustrative purpose, in FIG. 5B, the region defined by the second reflective surface 30A is shaded.

In this way, the first reflective surface 26A and the second reflective surface 30A are disposed at mutually different angles, similar to Embodiment 1. More specifically, in Embodiment 2, the entire second reflective surface 30A is disposed inclined at predetermined angle θ5 relative the first reflective surface 26A.

Scanning Mirror Operation

Next, how the scanning mirror 6A operates will be described with reference to FIG. 4 through FIG. 5B. As illustrated in FIG. 4 and FIG. 5A, the laser light emitted from the light source 4A is reflected by the first reflective surface 26A after entering the aperture 32 of the scanning mirror 6A. Here, since the first reflective surface 26A is oblique to the optical axis L2 of the laser light as described above, the laser light is reflected out of the aperture 32 toward the target object 20 by the first reflective surface 26A. As indicated by arrows P and Q in FIG. 4, the scanning mirror 6A oscillates about the axis C2 within angle of oscillation θ6 to scan the laser light reflected off the first reflective surface 26A toward the target object 20.

As illustrated in FIG. 4 and FIG. 5B, a portion of the laser light reflected from target object 20 is subsequently reflected by the second reflective surface 30A of the scanning mirror 6A. The laser light reflected from the second reflective surface 30A is received by the first photodetector 12A via the condenser lens 10A.

Area of the Aperture

Figure 6:
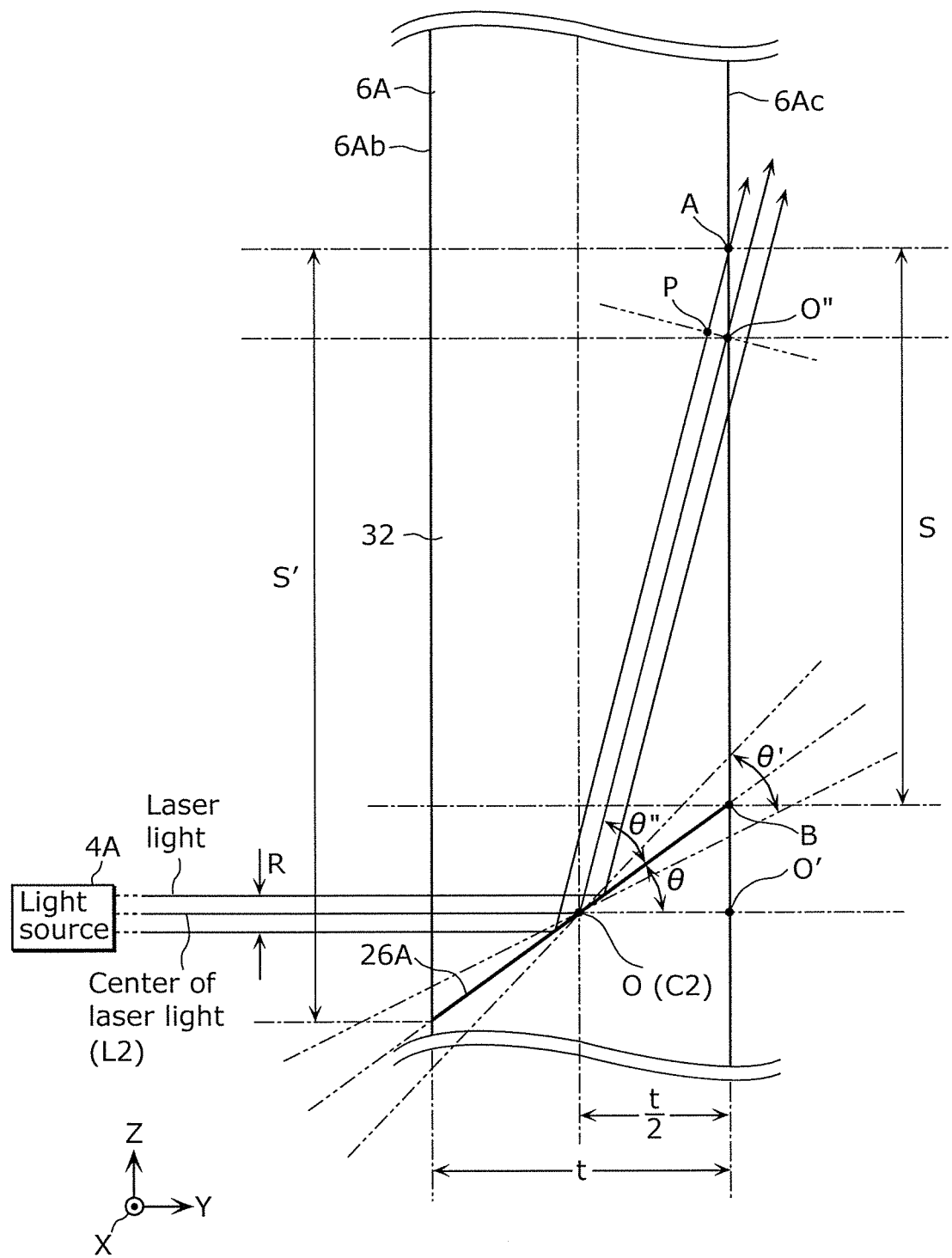
FIG. 6 illustrates a method for calculating the area of an aperture.

Next, with reference to FIG. 6, conditions for preventing the laser light emitted from the light source 4A from being blocked by the aperture 32 will be described. FIG. 6 illustrates a method for calculating the area of the aperture.

First, with reference to FIG. 6, the method for calculating an area S of the aperture 32 on the second surface 6Ac side that fulfills the conditions for preventing the laser light emitted from the light source 4A from being blocked by the aperture 32 will be described. Note that the following are assumed when calculating the area S: (I) the center of the laser light (i.e., optical axis L2) is perpendicular to the axis C2 of the scanning mirror 6A, (II) the center of the laser light is aligned with the center of the first reflective surface 26A, (III) the angle of inclination θ of the first reflective surface 26A and the angle θ" between the laser light and the first reflective surface 26A are each dependent on the optical arrangement of the enclosure of the light source 4A and the enclosure of the scanning mirror 6A, and (IV) the angle of oscillation θ' of the scanning mirror 6A is dependent on the mechanical, electrical, and chemical properties of the scanning mirror 6A.

As illustrated by FIG. 6, the area S is expressed as shown in Equation 1 below. In Equation 1, R is the diameter of the laser light, and AB is the Z axis length of the second surface 6Ac side of the aperture 32.

$$S = R \times AB \qquad \text{(Equation 1)}$$

Here, as illustrated by FIG. 6, the length AB of the opening is expressed as shown in Equation 2 below.

$$AB = AO'' + O''O - BO' \quad \text{(Equation 2)}$$

As illustrated by FIG. 6, the length AO'', the length O''O, and the length BO' are expressed as shown in Equations 3 through 5 below. Note that in Equations 3 through 5, t is the thickness of the scanning mirror 6A (in the Y axis direction), θ is the angle of inclination of first reflective surface 26A with respect to the Y axis, and θ'' is the angle between the laser light and the first reflective surface 26A.

$$AO'' = (\tfrac{1}{2}) \times R \times \tan(\theta + \theta'') \quad \text{(Equation 3)}$$

$$O''O = (\tfrac{1}{2}) \times t \times \tan(\theta + \theta'') \quad \text{(Equation 4)}$$

$$BO' = (\tfrac{1}{2}) \times t \times \tan\theta \quad \text{(Equation 5)}$$

The area S is calculated with Equation 6 below, which is formed by inserting Equations 3 through 5 in Equation 2, then inserting Equation 2 in Equation 1.

$$S = (\tfrac{1}{2}) \times \{(R+t) \times \tan(\theta + \theta'') - t \times \tan\theta\} \quad \text{(Equation 6)}$$

Next, with reference to FIG. 6, the method for calculating the area S' on the first surface 6Ab side of aperture 32 in order to fulfill the above conditions will be described. Note that generation and leakage of undesired light should be taken into consideration when calculating the area S'. In order to minimize these, the area S' should be reduced to the smallest possible degree, to a dimension that does not allow undesired light to pass through the aperture 32 (the critical dimension being the diameter of the laser light). In practice, however, since the mechanical, electrical, and chemical properties of the scanning mirror 6A must be taken into consideration, manufacturing a scanning mirror 6A with this critical dimension is complicated and costly. In light of this, hereinafter a method of calculating an area S' at which the scanning mirror 6A can be most efficiently manufactured will be discussed below.

As illustrated by FIG. 6, the area S' is expressed as shown in Equation 7 below.

$$S' = R \times \{(\tfrac{1}{2}) \times t \times \tan\theta + (\tfrac{1}{2}) \times t \times \tan\theta + AB\} \quad \text{(Equation 7)}$$

The area S' is calculated with Equation 8 below, which is formed by inserting Equations 2 through 5 in Equation 7.

$$S' = R \times (\tfrac{1}{2}) \times \{(R+t) \times \tan(\theta + \theta'') + t \times \tan\theta\} \quad \text{(Equation 8)}$$

As shown above, the size of the aperture 32 of the scanning mirror 6A may be designed such that the following inequalities are fulfilled: area S>Equation 6, and area S'<Equation 8. Note that the diameter R of the laser light is always the greatest specification value of the laser light.

Advantageous Effects

The laser scanner 2A according to Embodiment 2 achieves the following advantages effects. As described above, the scanning mirror 6A includes an aperture 32. The area S of the aperture 32 on the second surface 6Ac side of the scanning mirror 6A is smaller than the area of the notch 24 of the scanning mirror 6 according to Embodiment 1. With this, the surface area of the second reflective surface 30A can be enlarged.

Embodiment 3

Next, the laser scanner according to Embodiment 3 will be described with reference to FIG. 7 through FIG. 11.

Overall Configuration of Laser Scanner

First, the overall configuration of the laser scanner according to Embodiment 3 will be described with reference to FIG. 7 and FIG. 8.

Figure 7:
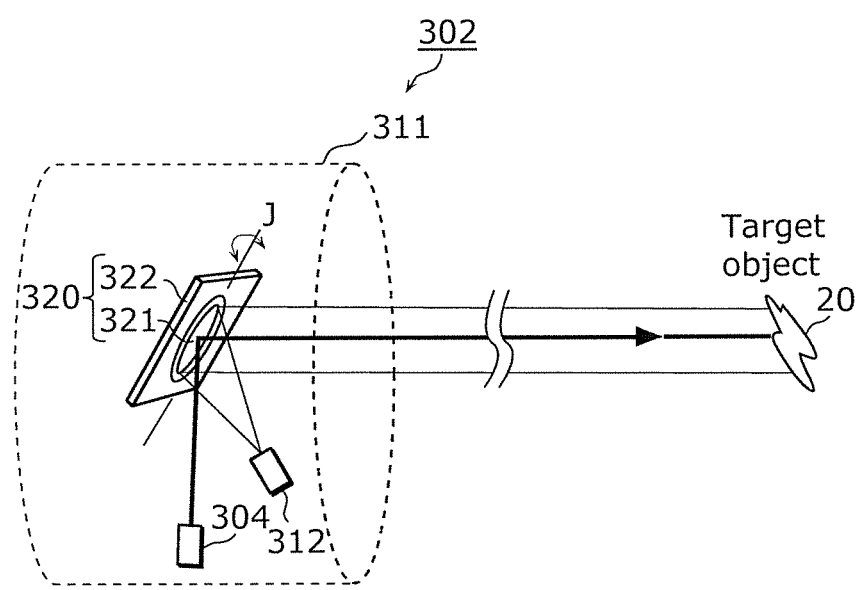
FIG. 7 is a schematic perspective view of one example of a configuration of a laser scanner according to Embodiment 3.
Figure 7:
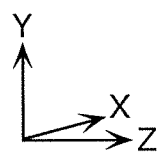
Figure 8:
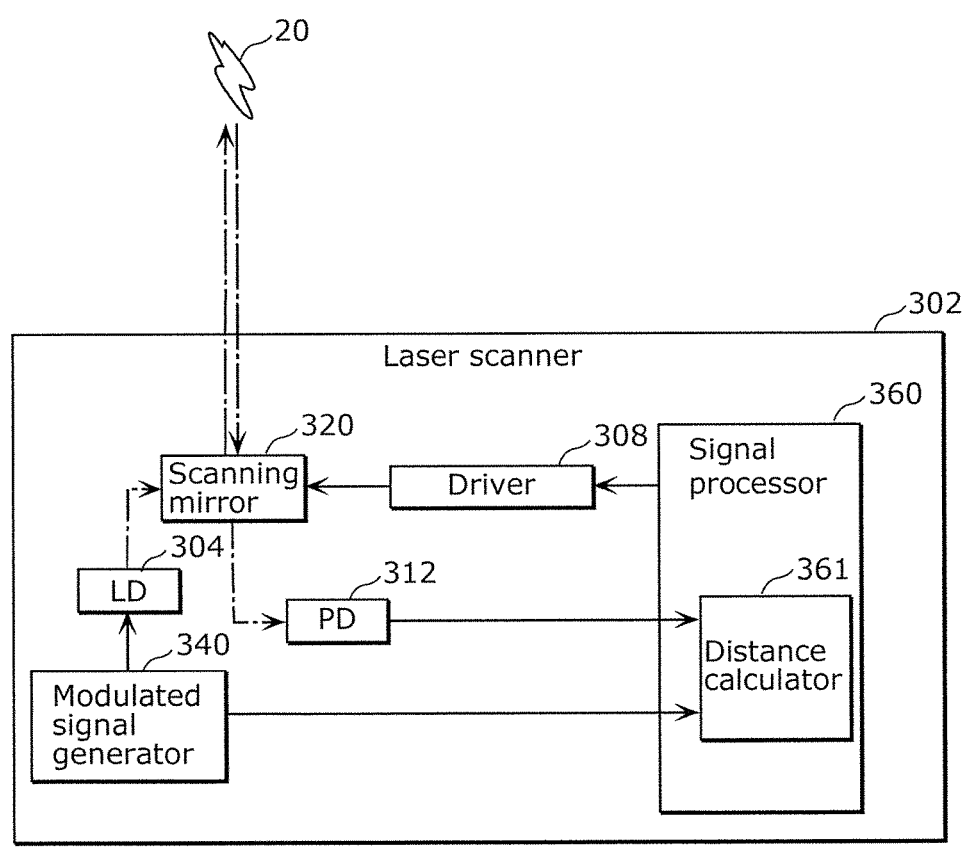
FIG. 8 is a block diagram illustrating a functional configuration of one example a laser scanner according to Embodiment 3.

FIG. 7 is a schematic perspective view of one example of the configuration of the laser scanner according to Embodiment 3. Note that the target object 20 of the laser scanner 302 is also illustrated in FIG. 7. FIG. 7 also illustrates the enclosure 311 of the laser scanner 302 as transparent so as to show the internals of the enclosure 311. FIG. 8 is a block diagram illustrating the functional configuration of one example the laser scanner 302 according to Embodiment 3. Note that in FIG. 8, electrical signal paths are illustrated with arrows, and light paths are illustrated with dotted and dashed arrows.

In FIG. 7, The Z axis is illustrated as being parallel to the scanning axis (reference direction) of the laser scanner 302, and the Y axis is illustrated as being parallel to the vertical directions (directions in which gravity works in an installed state). Hereinafter, the Y axis directions will be referenced as the vertical directions. However, depending on usage, it is conceivable that the Y axis directions may extend in directions other than the vertical directions. Therefore, the Y axis directions are not limited to extending in the vertical directions. The same applies to the Drawings referenced in the subsequent descriptions as well.

Moreover, hereinafter, the "positive direction of the X axis" refers to the direction in which the arrow of the X axis in the Drawings is pointing, and the "negative direction of the X axis" is the direction opposite the positive direction, for example. The same applies to the Y and Z axis directions.

As illustrated in FIG. 7, the laser scanner 302 according to Embodiment 3 includes, inside the enclosure 311, an LD 304, a scanning mirror 320, and a photodiode (PD) 312. An avalanche photodiode (APD), which is highly sensitive, may be used as the photodiode. The laser scanner 302 according to Embodiment 3 also includes a modulated signal generator 340, a driver 308, and a signal processor 360, as illustrated in FIG. 8. Here, the signal processor 360 includes a distance calculator 361 that calculates a distance to the target object 20.

The LD 304 is one example of the light source that emits laser light, and emits laser light in accordance with the modulated signal output by the modulated signal generator 340. The LD 304 is disposed inside the enclosure 311 and emits laser light toward the scanning mirror 320. The LD 304 corresponds to the light source according to Embodiments 1 and 2.

As illustrated in FIG. 7, the scanning mirror 320 is one example of a scanning mirror that oscillates about the axis of oscillation J to scan the laser light emitted from the LD 304, and includes a mirror component 321 and an actuator 322 that oscillates the mirror component 321. The scanning mirror 320 is, for example, a MEMS mirror including the mirror component 321, which is a minuscule mechanical component, disposed on a silicon substrate having an electronic circuit thereon. Note that the structure of the scanning mirror 320 will be described in detail later. The axis of oscillation J of the scanning mirror 320 is, specifically, the axis of oscillation of the mirror component 321 of the scanning mirror 320 to be described later. In other words, the scanning mirror 320 oscillates about a predetermined axis (in Embodiment 3, the axis of oscillation J) to scan laser light from the light source (in Embodiment 3, the LD 304) toward the target object 20, and reflects laser light reflected from the target object 20 (also referred to as "reflected light" in Embodiment 3).

The PD 312 is one example of the photodetector that receives, via the scanning mirror 320, reflected light, which is laser light scanned on the target object 20 by the scanning mirror 320 and then reflected from the target object 20, and outputs an electrical signal indicating an amount of light received to the distance calculator 361. The PD 312 corresponds to the first photodetector according to Embodiments 1 and 2, and receives laser light reflected from the target object 20 via the scanning mirror 320.

Here, the LD 304 and the PD 312 are disposed in different directions relative to the scanning mirror 320. In other words, the path of laser light reaching the scanning mirror 320 from the LD 304 and the path of reflected light reaching the PD 312 from the scanning mirror 320 are separated. The mechanism that separates these light paths will be described later in the detailed description of the structure of the scanning mirror 320.

In Embodiment 3, the LD 304 and the PD 312 are disposed in different directions relative to the scanning mirror 320 in the YZ plane including the LD 304, the PD 312, and the scanning mirror 320, as illustrated in FIG. 7.

The modulated signal generator 340 generates a modulated signal in the laser light emitted by the LD 304, and outputs the modulated signal to the distance calculator 361.

The driver 308 generates drive current for driving the scanning mirror 320 in accordance with the output of the signal processor 360, and outputs the drive current to the scanning mirror 320.

The signal processor 360 includes the distance calculator 361, and similar to the processor 18 according to Embodiment 1, is, for example, a system LSI circuit.

Similar to the processor 18 according Embodiment 1, the distance calculator 361 calculates the distance between the laser scanner 302 and the target object 20. More specifically, the distance calculator 361 calculates an elapse of time from when laser light is emitted from the LD 304 until the laser light is received by the PD 312 using the phase difference between the reflected light received by the PD 312 and the modulated signal generated by the modulated signal generator 340. This elapse of time is the time it takes the laser light to travel round-trip from the LD 304 to the target object 20 and back. Thus, the distance calculator 361 can calculate the above-described distance by multiplying half the calculated time by the speed of light.

The laser scanner 302 configured in this way measures the distance to the target object 20 by scanning laser light with the scanning mirror 320 and receiving reflected laser light reflected from the target object 20.

Scanning Mirror

Next, the scanning mirror 320 will be described with reference to FIG. 9 through FIG. 11.

Figure 9:
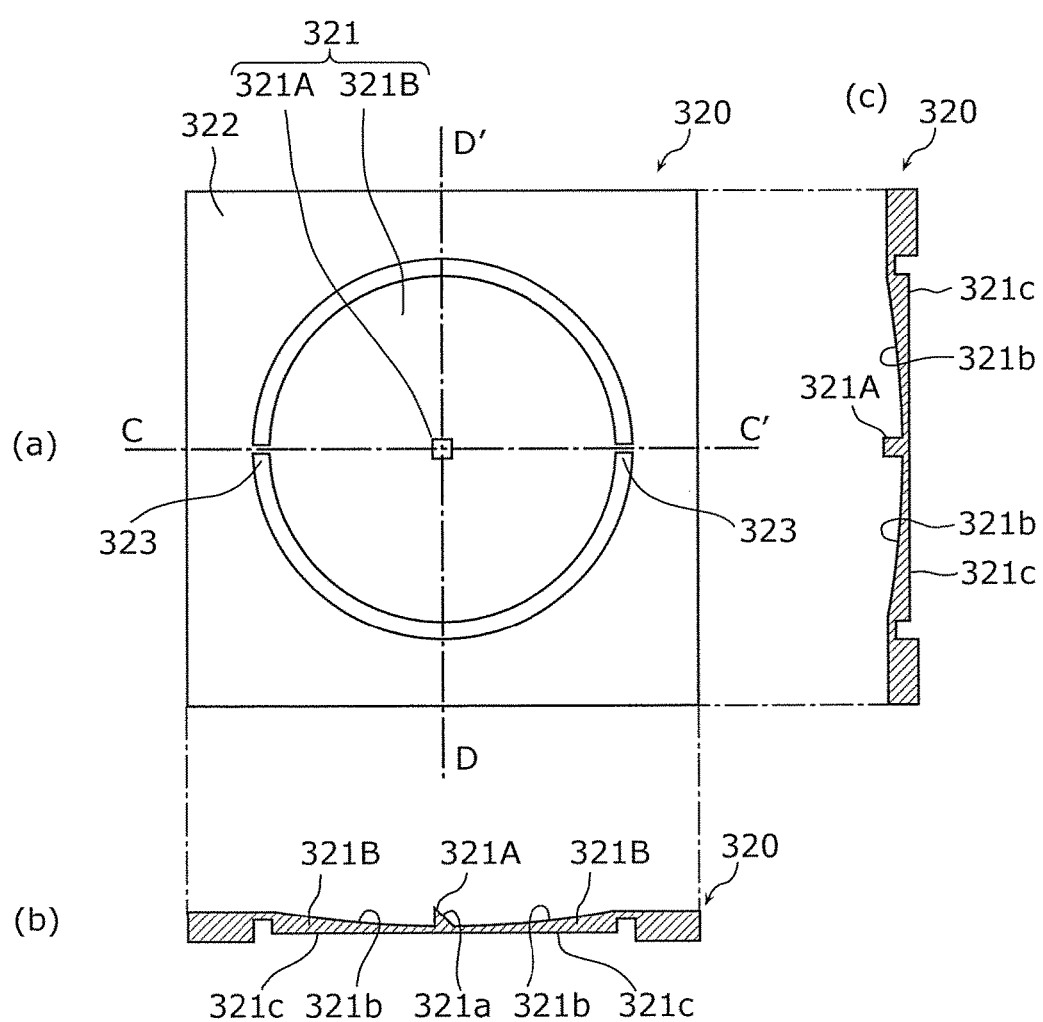
FIG. 9 illustrates one example of the structure of a scanning mirror according to Embodiment 3.

FIG. 9 illustrates one example of the structure of the scanning mirror 320 according to Embodiment 3. In FIG. 9, (a) is a top view, (b) is a cross sectional view taken at line C-C' in (a), and (c) is a cross sectional view taken at line D-D' in (a). FIG. 10 is a perspective view illustrating reflection of laser light by the scanning mirror 320 according to Embodiment 3. FIG. 11 is a cross sectional view of the mirror component 321 taken along the axis of oscillation J in FIG. 10. Note that FIG. 10 and FIG. 11 also illustrate the LD 304, the PD 312, the laser light L31 reaching the scanning mirror 320 from the LD 304, the laser light L32, which is the laser light L31 after reflecting off the scanning mirror 320, the reflected light L33, which is the laser light L32 after reflecting off the target object 20, and the reflected light L34, which is the reflected light L33 after reflecting off the scanning mirror.

Figure 10:
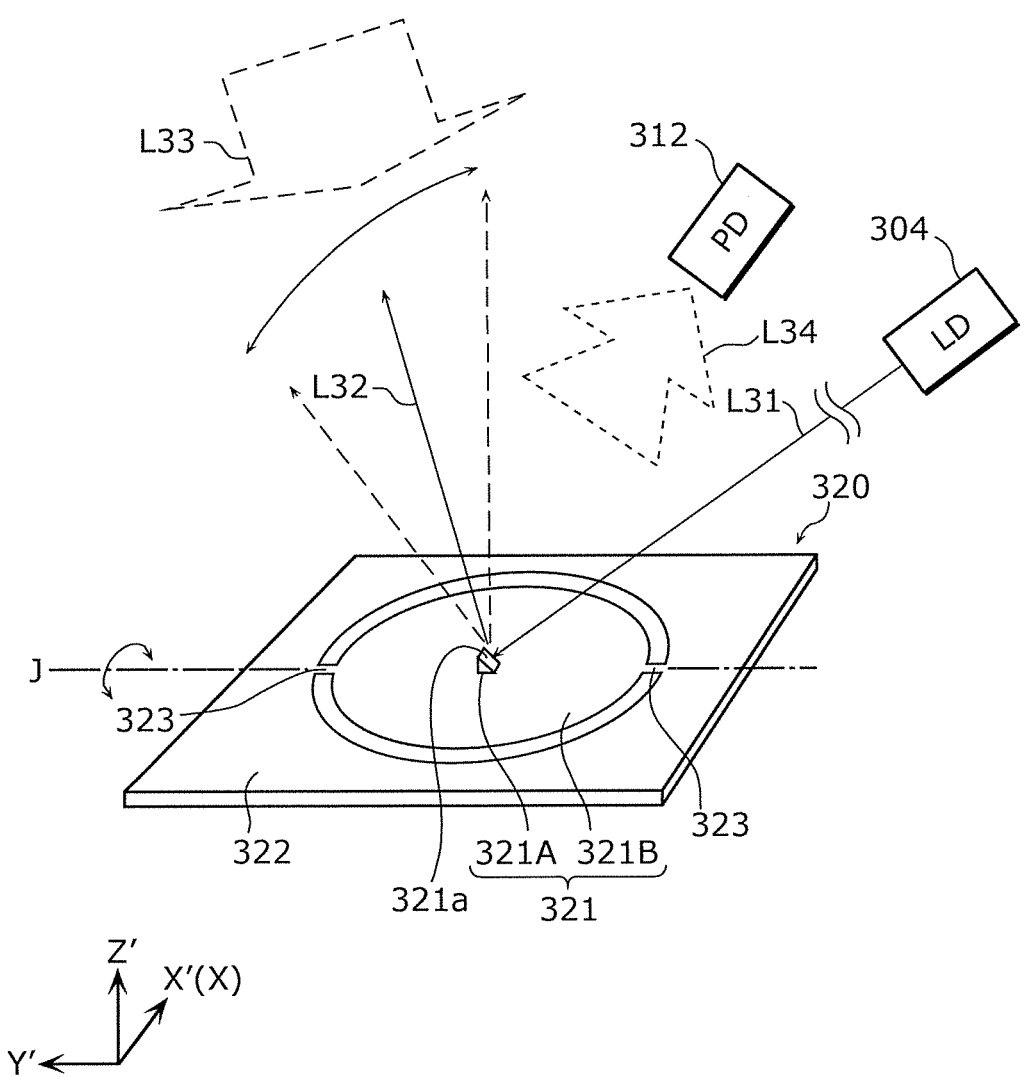
FIG. 10 is a perspective view illustrating reflection of laser light by a scanning mirror according to Embodiment 3.
Figure 11:
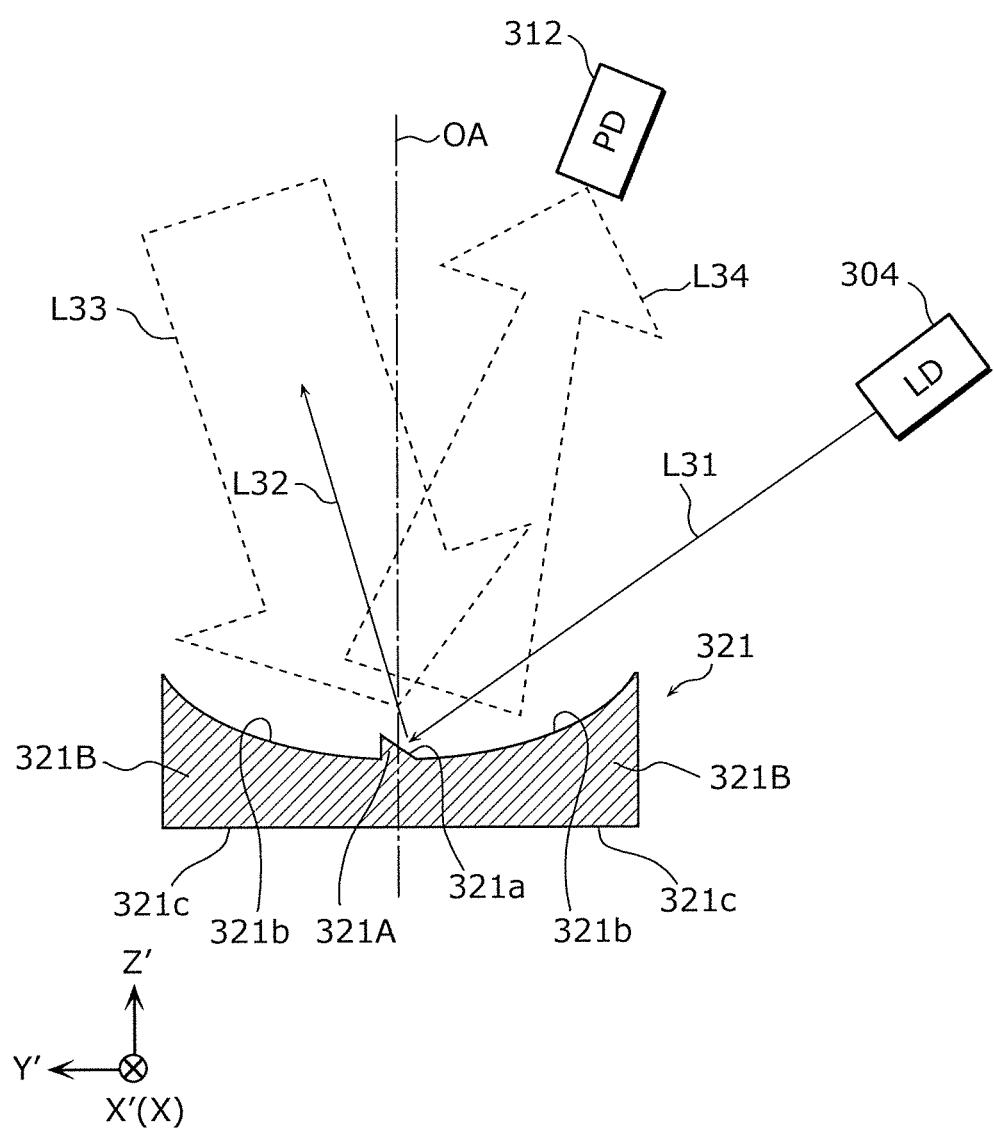
FIG. 11 is a cross sectional view of a mirror component taken along the axis of oscillation J in FIG. 10.

Note that in FIG. 10 and FIG. 11, the X' axis direction is illustrated as the same direction as the X axis direction in FIG. 7, the Y' axis direction is illustrated as the direction in which the axis of oscillation J of the scanning mirror 320 extends, and the Z' axis direction is illustrated as a direction that is perpendicular to both the X' and Y' axis directions.

As illustrated in FIG. 9 and FIG. 10, the mirror component 321 and the actuator 322 are mechanically connected together via a pair of torsion bars 323.

Scanning Mirror Structure

Next, the structure of the mirror component 321 will be described.

The mirror component 321 includes a first mirror 321A that reflects the laser light L31 emitted from the LD 304, and a second mirror 321B that reflects the reflected light L33 from the target object 20 and condenses the reflected light L34 to guide the reflected light L34 to the PD 312. The mirror component 321 reflects at least part of light of a predetermined wavelength, for example. The predetermined wavelength is the wavelength of the laser light L31 emitted from the LD 304.

With this, as illustrated in FIG. 9 and FIG. 10, the laser light L31 emitted from the LD 304 is projected out of the laser scanner 302 and scanned by being reflected off the first mirror 321A. Among the laser light L32 projected and scanned out of the laser scanner 302, the reflected light L33 reflected back from the target object 20 is received by the PD 312 after being reflected and condensed by the second mirror 321B.

Thus, with the laser scanner 302 according to Embodiment 3, the path of the laser light L31 reaching the scanning mirror 320 from the LD 304, can be separated from the path of the reflected light L34 reaching the PD 312 from the scanning mirror 320.

Moreover, in Embodiment 3, the second mirror 321B included in the scanning mirror 320 condenses the reflected light L33 from the target object 20.

Here, since the reflected light L33 is the laser light L32 after it has been reflected and scattered by the target object 20, the strength of the reflected light L33 is much more faint than the strength of the laser light L31 and the laser light L32. In light of this, in the laser scanner 302 according to Embodiment 3, the S/N ratio of the reflected light received by the PD 312 can be increased by condensing the reflected light L33 with the second mirror 321B. With this, the laser scanner 302 can measure the distance to the target object 20 even when the strength of the reflected light L33 from the target object 20 is weak due to, for example, the distance between the laser scanner 302 and the target object 20 being far or the target object 20 being small. In other words, the distance measurement accuracy of the laser scanner 302 can be increased.

Scanning Mirror Light Path Separation Mechanism

Next, the mechanism that separates the light paths described above will be described with reference to the structures of the first mirror 321A and the second mirror 321B.

The first mirror 321A is disposed along the optical axis OA of the second mirror 321B, as illustrated in FIG. 11. As illustrated in FIG. 9 through FIG. 11, the first mirror 321A is more specifically a protrusion that protrudes outward from the second mirror 321B. Even more specifically, the first mirror 321A has a triangular column shape having a substantially triangular cross section in a plane parallel to the axis of oscillation J (the Y'Z' plane in the Drawings) and a substantially rectangular cross section in a plane perpendicular to the axis of oscillation J (the X'Z' plane in the Drawings).

Here, the reflective surface 321a that is included in the first mirror 321A and reflects the laser light L31 is oblique to a plane perpendicular to the optical axis OA (i.e., oblique to the X'Y' plane in the Drawings). The reflective surface 321a is, for example, a quadrilateral with a 0.5 mm side, and is larger than the diameter (spot diameter) of the laser light L31 emitted from the LD 304. Thus, the laser light L31 emitted from the LD 304 is reflected by the reflective surface 321a.

In other words, the reflective surface 321a of the first mirror 321A is one example of the first reflective surface that scans laser light by reflecting the laser light L31 from the light source (in Embodiment 3, the LD 304).

The first mirror 321A is disposed along the axis of oscillation J of the scanning mirror 320. More specifically, the first mirror 321A is disposed along the axis of oscillation J of the mirror component 321. Note that "disposed along the axis of oscillation J" includes positions in the vicinity of the axis of oscillation J (i.e., positions in a range about the axis of oscillation J that is equal to 10 percent of the diameter of the mirror component 321).

As illustrated in FIG. 9 and FIG. 11, the second mirror 321B is a concave mirror having a concave reflective surface 321b that reflects the reflected light L33 from the target object 20. In other words, the scanning mirror 320 according to Embodiment 3 includes a concave mirror including the concave second reflective surface 321b. The optical axis OA of the second mirror 321B is, for example, parallel to the Z' axis of the center of the second mirror 321B in the X'Y' plane. The reflective surface 321b has, for example, a parabolic shape or a partial spheroid shape, and has a diameter, in a plane perpendicular to the optical axis OA of the reflective surface 321b (i.e., the X'Y' plane in the Drawings), that is, for example, 3.0 mm.

In other words, the reflective surface 321b of the second mirror 321B is one example of the second reflective surface that reflects laser light reflected from the target object 20 (in Embodiment 3, the reflected light L34), toward the photodetector (in Embodiment 3, the PD 312).

With this configuration, the laser light L31 emitted from the LD 304 is reflected off the reflective surface 321a of the mirror component 321, which is oscillated about the axis of oscillation mirror component 321 to scan the laser light L32 over an area and reach the target object 20. The laser light L32 is reflected (and scattered) by the target object 20, and the reflected light L33 reflected from the target object 20 is further reflected so as to travel along an axis facing the reflected light L33 and about the optical axis OA, and reach the PD 312 as reflected light L34. Here, the concave mirror shape of the reflective surface 321b of the mirror component 321 condenses the reflected light L34 before it reaches the PD 312.

The optical axis of the laser light L32 reflected to the target object 20 and the optical axis of the reflected light L33 reflected from the target object 20 can be regarded as substantially coincidental. Thus, the angle between the optical axis of the laser light L31 and the optical axis of the reflected light L34 is double the angle of inclination of the reflective surface 321a relative to a plane perpendicular to the optical axis OA (i.e., the X'Y' plane in the Drawings). As a result, the scanning mirror 320 can separate the path of the laser light L31 and the path of the reflected light L34 at an angle that is double said angle of inclination.

In other words, the LD 304 and the PD 312 are disposed such that, in a plane (the YZ plane) including the LD 304, the PD 312, and the scanning mirror 320, the angle between a line passing through the scanning mirror 320 and the LD 304 and a line passing through the scanning mirror 320 PD 312 is double said angle of inclination.

In this way, with Embodiment 3, since the scanning mirror 320 includes the first mirror 321A, which includes the reflective surface 321a that reflects the laser light L31 from the LD 304, and the second mirror 321B, which includes the reflective surface 321b that reflects and condenses the reflected light L33 from the target object 20 in a different direction than the laser light L31, the path of the laser light L31 and the path of the reflected light L34 can be separated.

In this way, with Embodiment 3, the reflective surface 321a of the first mirror 321A and at least part of the reflective surface 321b of the second mirror 321B are disposed at mutually different angles.

Comparative Example

Next, a conceivable structure will be described in which a scanning mirror that oscillates a flat, plate-like mirror component is used to separate the path of laser light emitted from the LD and the path of reflected light reflected toward the PD and collect the reflected light. More specifically, the conceivable structure includes an optical component disposed along the path of laser light reaching the scanning mirror from the LD, for separating light paths, and an optical component disposed along the path of reflected light reflected from the scanning mirror and reaching the PD, for condensing said reflected light.

Examples of these optical components include a concave mirror including a surface, formed on part of the reflective surface for condensing the reflected light from the scanning mirror toward the PD, for guiding laser light from the LD toward the scanning mirror. Other conceivable examples include providing, on a flat, plate-like mirror component for reflecting the reflected light from the scanning mirror toward the PD, a combination of a mirror with an aperture for guiding laser light reflected from the LD, toward the scanning mirror, and a condenser lens for condensing, toward the PD, light reflected by the mirror with the aperture among the reflected light from the scanning mirror.

However, such a structure is undesirable since an optical component for condensing the small amount of reflected light reflecting off the flat, plate-like mirror component after reflecting from the measurement target object is required between the scanning mirror and the PD in order to efficiently use said small amount of the reflected light. Also undesirable is that the surface area of the light receiving surface of the optical component is required to be the same size as the flat, plate-like mirror component. In other words, such a structure is undesirable because said structure requires an increased number of optical components, resulting in a greater overall size of the laser scanner.

Moreover, with laser scanners, the more laser light and reflected light that turns back inside the laser scanner or the greater number of stages of optical components, the more undesired light and stray light can be expected. Since the reflected light from the measurement target object is significantly faint, when unwanted light and stray light is produced, the reflected light may become buried by the unwanted light and stray light. If the reflected light becomes buried, an accurate measurement result (i.e., the distance to the measurement target object) cannot be obtained.

In contrast, with Embodiment 3, the scanning mirror 320 includes a first mirror 321A that reflects the laser light L31 emitted from the LD 304, and a second mirror 321B that reflects the reflected light L33 from the target object 20 and condenses the reflected light L34 to guide the reflected light L34 to the PD 312. In other words, the scanning mirror 320 has a light condensing function in addition to a light reflecting function. With this, the laser scanner 302 according to Embodiment 3 does not require an optical component for condensing the reflected light L33. As a result, a compact laser scanner 302 can be realized since the number of optical components required can be reduced. Furthermore, by reducing the number of optical components used, unwanted light and stray light can be inhibited from generating in the laser scanner 302. As a result, the S/N ratio of the reflected light L34 received by the PD 312 can be increased, whereby the distance measurement accuracy can be increased.

Conclusion

As described above, the laser scanner 302 according to Embodiment 3 includes a scanning mirror 320 that includes a first mirror 321A that reflects the laser light L31 emitted from the LD 304, and a second mirror 321B that reflects the reflected light L33 from the target object 20 and condenses the reflected light L34 to guide the reflected light L34 to the PD 312.

With this, the paths of the laser light L31 and the reflected light L34 can be separated, and the requirement of providing an optical component for condensing the reflected light L33 can be eliminated. Alternatively, the amount of light received can be increased by using a scanning mirror having a surface area larger than the surface area of the effective light receiving surface of the provided optical component. With this, a compact laser scanner 302 can be realized and the number of optical components can be reduced. Furthermore, by reducing the number of optical components used, unwanted light and stray light can be inhibited from generating in the laser scanner 302. As a result, the S/N ratio of the reflected light L34 received by the PD 312 can be increased, whereby the distance measurement accuracy can be increased.

In other words, similar to Embodiment 1, the scanning mirror 320 according to Embodiment 3 includes a first reflective surface (in Embodiment 3, the reflective surface 321*a*) that scans laser light by reflecting laser light from the light source (in Embodiment 3, the LD 304), and a second reflective surface (in Embodiment 3, the reflective surface 321*b*) that reflects, toward the photodetector (in Embodiment 3, the PD 312), the laser light reflected from the target object 20. Moreover, the first reflective surface and at least part of the second reflective surface are disposed at mutually different angles.

With this, the same advantageous effects achieved with Embodiment 1 can be achieved with Embodiment 3 as well. In other words, since the light path for the light transmitting system and the light path for the light receiving system can be separated by the scanning mirror 320, a compact laser scanner 302 can be realized.

Moreover, in Embodiment 3, the second reflective surface (in Embodiment 3, the reflective surface 321*b*) reflects and condenses, toward the photodetector (in Embodiment 3, the PD 312), the laser light reflected from the target object 20.

With this, the number of optical components, such as the condenser lens, used in the laser scanner 3 is reduced, allowing for an even more compact laser scanner 302.

Moreover, in Embodiment 3, the first mirror 321A is disposed along the optical axis OA of the second mirror 321B. In other words, in Embodiment 3, the first reflective surface (in Embodiment 3, reflective surface 321*a*) is disposed along the optical axis OA of the second reflective surface (in Embodiment 3, the reflective surface 321*b*). Moreover, the reflective surface 321*a* that is included in the first mirror 321A and reflects the laser light L31 is oblique to a plane perpendicular to the optical axis OA (i.e., oblique to the X'Y' plane in the Drawings).

The optical axis of the laser light L32 reflected to the target object 20 and the optical axis of the reflected light L33 reflected from the target object 20 can be regarded as substantially coincidental. Thus, the angle between the optical axis of the laser light L31 and the optical axis of the reflected light L34 is double the angle of inclination of the reflective surface 321*a* relative to a plane perpendicular to the optical axis OA (i.e., the X'Y' plane in the Drawings). As a result, the scanning mirror 320 can separate the path of the laser light L31 and the path of the reflected light L34 at an angle that is double said angle of inclination.

Note that the first mirror 321A may be disposed in a position other than a position along the optical axis OA, and the reflective surface 321*a* that is included in the first mirror 321A and reflects the laser light L31 is not required to be oblique to a plane perpendicular to the optical axis OA (i.e., oblique to the X'Y' plane in the Drawings). For example, the first mirror 321A may be disposed on the edge of the second mirror 321B, and the reflective surface 321*a* may be disposed parallel to a plane that is perpendicular to the optical axis OA.

Moreover, in Embodiment 3, the first mirror 321A is disposed along the axis of oscillation J of the scanning mirror 320. More specifically, the first mirror 321A is disposed along the axis of oscillation J of the mirror component 321.

With this, a compact first mirror 321A can be achieved. In other words, a compact reflective surface 321*a* in the first mirror 321A can be achieved. More specifically, by disposing the first mirror 321A along the axis of oscillation J of the scanning mirror 320, changes in the position of the first mirror 321A due to oscillation can be inhibited. Since the laser light L31 emitted from the LD 304 is highly directional, changes in the position of the first mirror 321A due to oscillation is small, and the reflective surface 321*a* can be made to have a substantially small surface area.

Note that in addition to the first mirror 321A, the torsion bars 323 may also reflect the laser light L31 emitted from the LD 304. In other words, the axis of oscillation J is an axial line that passes through the torsion bar 323 and the center of oscillation of the mirror component 321, and "the first mirror 321A is disposed along the axis of oscillation J" includes the first mirror 321A being disposed on the torsion bar 323.

The first mirror 321A may be disposed in a position that is not along the axis of oscillation J. In this case, by making the reflective surface 321*a* of the first mirror 321A larger than the size according to Embodiment 3, the laser light L31 emitted from the LD 304 can be reflected and scanned by the first mirror 321A.

Moreover, in Embodiment 3, the second mirror 321B surrounds the first mirror 321A. More specifically, in a view of the scanning mirror 320 in the plus direction of the Z' axis, the second mirror 321B surrounds the first mirror 321A. In other words, in Embodiment 3, the second reflective surface (in Embodiment 3, the reflective surface 321*b*) surrounds the first reflective surface (in Embodiment 3, reflective surface 321*a*).

By disposing the second mirror 321B, which has a light condensing function, to surround the first mirror 321A, the surface area of the reflective surface 321*b*, which receives and reflects the faint, scattered reflected light 33 reflected from the target object 20, can be enlarged. As a result, the reflected light L33 reflected from the target object 20 can be received by the reflective surface 321b sufficiently large in surface area and condensed to the PD 312, which allows the PD 312 to obtain a signal having a good S/N ratio.

Moreover, in Embodiment 3, as illustrated in FIG. 9 and FIG. 11, the rear surface 321c of the reflective surface 321b that reflects the reflected light from the second mirror 321B is substantially planar and disposed perpendicular to the optical axis OA of the second mirror 321B. In other words, a substantially planar surface (in Embodiment 3, the rear surface 321c) opposing the second reflective surface (in Embodiment 3, the reflective surface 321b) of the scanning mirror 320 is perpendicular to the optical axis OA of the second reflective surface. Moreover, the optical axis OA intersects the axis of oscillation J of the scanning mirror 320.

Here, since the second mirror 321B has a light condensing function, the thickness of the second mirror 321B varies in different parts. In other words, the mass of the second mirror 321B per unit area varies depending on distance from the optical axis OA. Thus, by having a configuration in which the optical axis OA intersects the axis of oscillation J, the second mirror 321B has left-right symmetry about the axis of oscillation J, thereby balancing the mass of the second mirror 321B. As a result, the scanning mirror 320 can easily be oscillated with resonance.

Note that the rear surface of the reflective surface 321b of the second mirror 321B that reflects the reflected light is not required to be a planar surface. For example, the rear surface may be a curved surface. Moreover, the optical axis OA is not required to intersect the axis of oscillation J of the scanning mirror 320. Even when the optical axis OA does not intersect the axis of oscillation J, the mass of the second mirror 321B may be balanced by configuring the second mirror 321B so that it's left-right mass about the axis of oscillation J is essentially even. In other words, the scanning mirror 320 can easily be oscillated with resonance.

Moreover, in Embodiment 3, the first mirror 321A is a protrusion protruding outward from the second mirror 321B. In other words, the scanning mirror 320 includes the first mirror 321A, which is a protrusion that protrudes outward from the second reflective surface (in Embodiment 3, the reflective surface 321b), and the first reflective surface (in Embodiment 3, the reflective surface 321a) is part of a surface formed by the protrusion.

Note that the shape of the first mirror 321A is not limited to this example. For example, the first mirror 321A may be a recess receding inward from the second mirror 321B. In other words, in Embodiment 3, although the reflective surface 321a that reflects the laser light L31 emitted from the LD 304 is described as being part of a surface formed by a protrusion, the reflective surface 321a may be part of a surface formed by recess.

Embodiment 4

Next, the laser scanner according to Embodiment 4 will be described with reference to FIG. 12 through FIG. 13.

Figure 12:
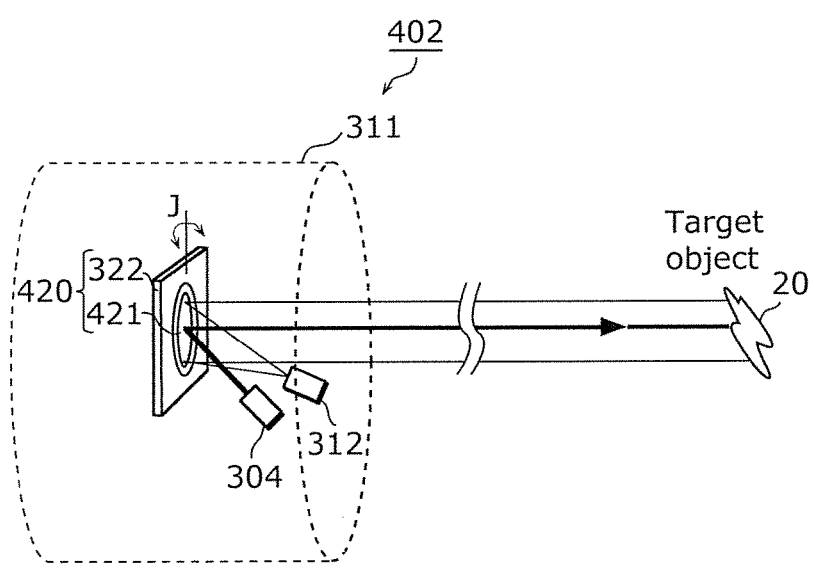
FIG. 12 is a schematic perspective view of one example of a configuration of a laser scanner according to Embodiment 4.
Figure 12:
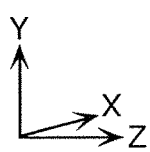

FIG. 12 is a schematic perspective view of one example of the configuration of the laser scanner 402 according to Embodiment 4. Note that the target object 20 of the laser scanner 402 is also illustrated in FIG. 12. FIG. 12 also illustrates the enclosure 311 of the laser scanner 402 as transparent so as to show the internals of the enclosure 311.

Figure 13:
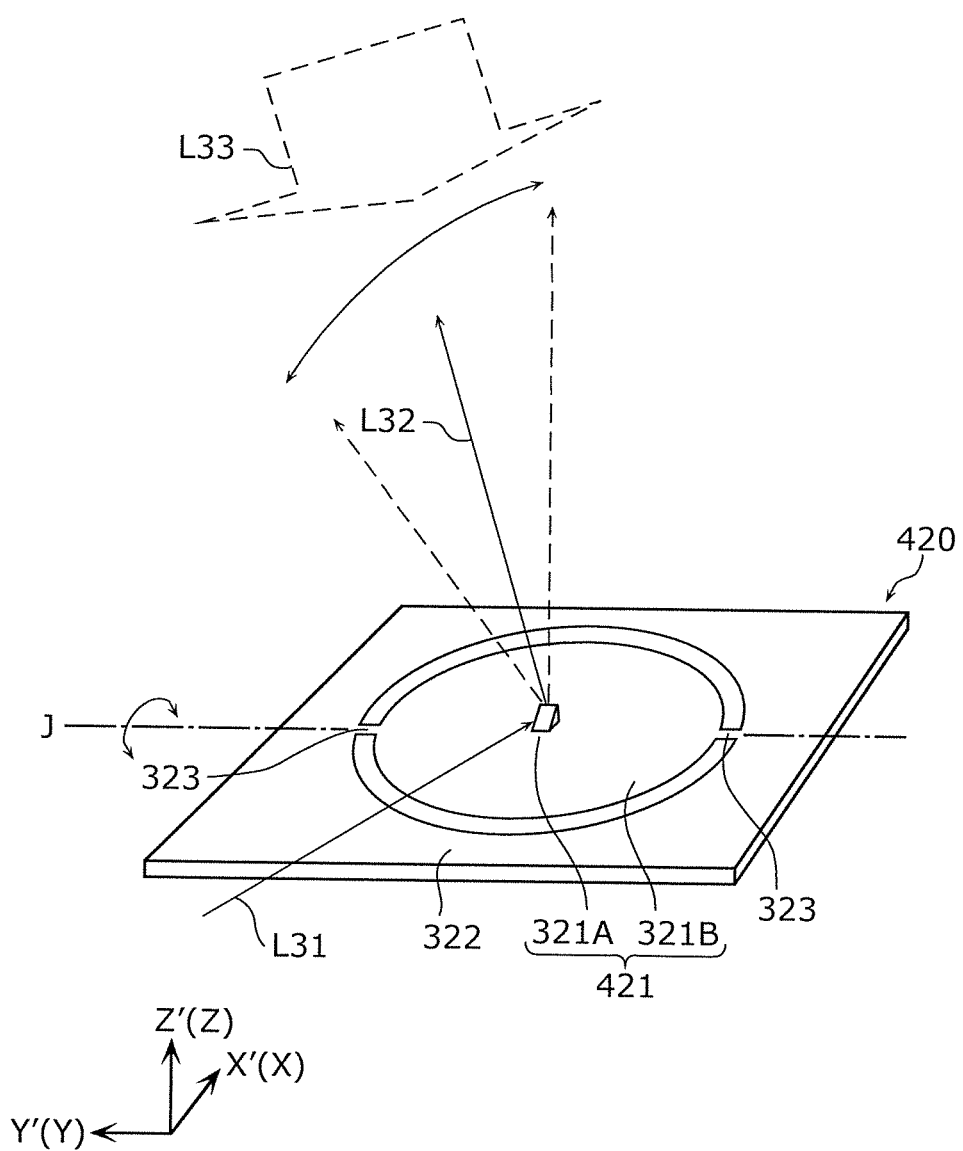
FIG. 13 is a perspective view illustrating reflection of laser light by a scanning mirror according to Embodiment 4.

FIG. 13 is a perspective view illustrating reflection of laser light by the scanning mirror 420 according to Embodiment 4.

The laser scanner 402 according to Embodiment 4 is substantially similar to the laser scanner 302 according to Embodiment 3, but differs in that the optical axis of the laser light emitted from the LD 304 is horizontal. More specifically, in Embodiment 3, the LD 304, the PD 312, and the scanning mirror 320 are all disposed in the YZ plane, but in Embodiment 4, the LD 304, the PD 312, and the scanning mirror 420 are all disposed in the XZ plane. In other words, in Embodiment 4, in the XZ plane including the LD 304, the PD 312, and the scanning mirror 420, the LD 304 and the PD 312 are disposed in different directions relative to the scanning mirror 420.

Moreover, in Embodiment 3, the axis of oscillation J of the scanning mirror 320 is oblique to the Y axis, but in Embodiment 4, the axis of oscillation J of the scanning mirror 420 is parallel to the Y axis.

The first mirror 321A of the mirror component 421 according to Embodiment 4 has a triangular column shape having a substantially rectangular cross section in a plane parallel to the axis of oscillation J (the Y'Z' plane in the Drawings) and a substantially triangular cross section in a plane perpendicular to the axis of oscillation J (the X'Z' plane in the Drawings).

In this way, even if the LD 304, the PD 312, and the scanning mirror 420 are all disposed in the XZ plane, the same advantageous effects of Embodiment 3 can be achieved. In other words, with the laser scanner 402 according to Embodiment 4, a compact laser scanner can be realized and the number of optical components can be reduced. Furthermore, by reducing the number of optical components used, unwanted light and stray light can be inhibited from generating in the laser scanner 402. As a result, the S/N ratio of the reflected light received by the PD 312 can be increased, whereby the distance measurement accuracy can be increased.

Other Embodiments

Hereinbefore the laser scanner according to the present invention has been described based on Embodiments 1 through 4, but the present invention is not limited to these embodiments.

In the above embodiments, the scanning mirror 6 (6A) oscillates about a single axis, but the present invention is not limited to this example. For example, the scanning mirror 6 (6A) may oscillate about two axes (e.g., horizontal and vertical axes).

In Embodiment 1, the low-reflection surface 28 is formed by coating the first surface 6b of the scanning mirror 6 black. In Embodiment 2, the low-reflection surface 28A is formed by patterning a texture on the first surface 6Ab of the scanning mirror 6A. In addition to these methods, the low-reflection surface may be formed as a napped cloth material applied to the first surface 6b (6Ab) of the scanning mirror 6 (6A), for example.

In Embodiment 1, the first reflective surface 26 is perpendicular to the second reflective surface 30, but the present invention is not limited to this example. For example, the first reflective surface 26 may be inclined at a predetermined angle (greater than 0° degrees and less than 90° degrees) relative to the second reflective surface 30.

In Embodiment 2, the first reflective surface 26A is oblique to the second reflective surface 30A, but the present invention is not limited to this example. For example, the first reflective surface 26A may be perpendicular to the second reflective surface 30A.

In the above embodiments, the notch 24 and the aperture 32, which are examples of the opening, are formed hollow, but the present invention is not limited to this example. For example, transparent glass may be disposed in the notch 24 and the aperture 32.

Figure 14:
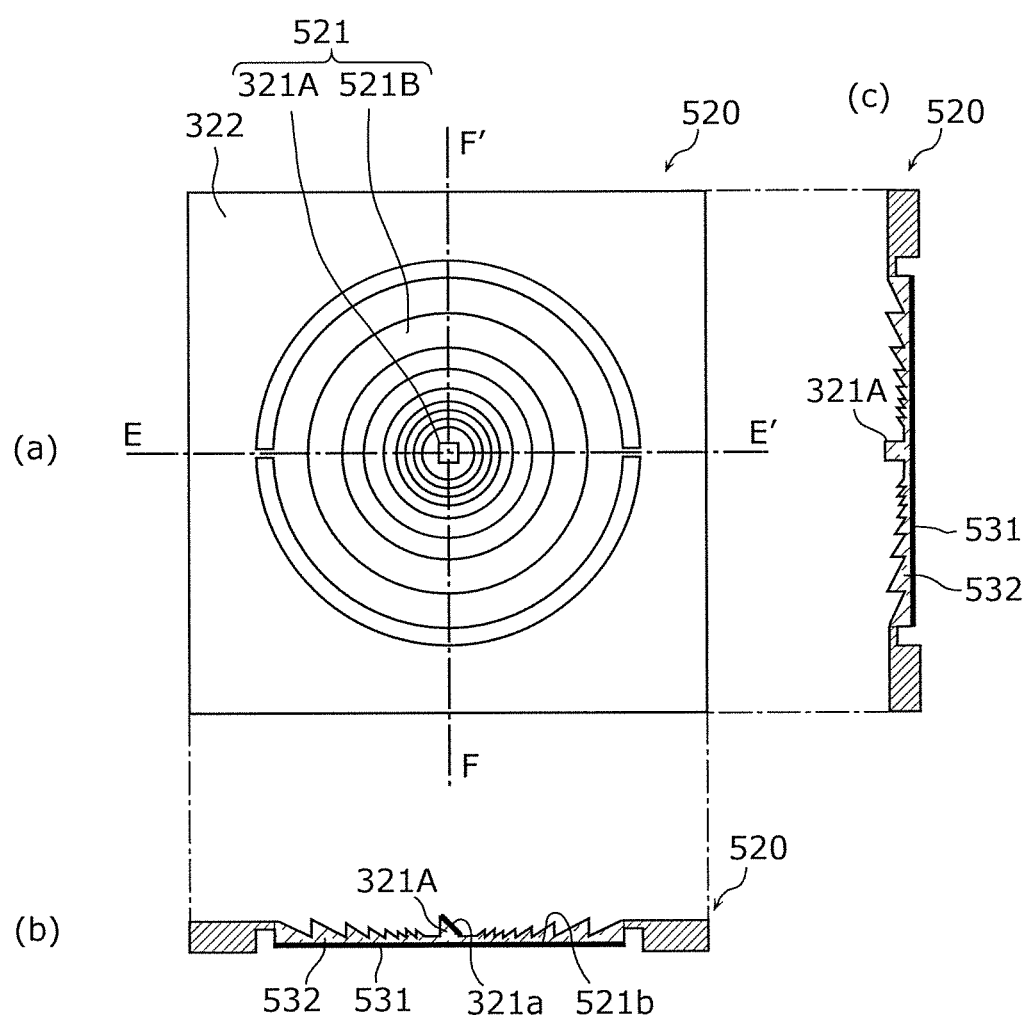
FIG. 14 illustrates one example of the structure of a scanning mirror according to Embodiment 4.

The scanning mirror may, for example, have the structure illustrated in FIG. 14. FIG. 14 illustrates one example of the structure of the scanning mirror 520 according to Embodiment 4. In FIG. 14, (a) is a top view, (b) is a cross sectional view taken at line E-E' in (a), and (c) is a cross sectional view taken at line F-F' in (a). Compared to the scanning mirror 320 according to Embodiment 3, the scanning mirror 520 in FIG. 14 includes a mirror component 521 including a second mirror 521B instead of the second mirror 321B.

As illustrated in FIG. 14, the second mirror 521B, which guides reflected light to the PD 312 by reflecting and condensing the reflected light from the target object 20, includes a reflective component 531 that reflects reflected light and a lens component 532 that is stacked on the reflective component 531 and transmits and collects the reflected light. With this configuration, laser light reflected from the target object 20 is reflected at the interface 521b between the reflective component 531 and the lens component 532 in the second mirror 521B. In other words, with this configuration, the interface 521b is equivalent to the second reflective surface.

For example, the front surface of the second mirror 521B may be the lens component 532 formed as a Fresnel lens on which the laser light and the reflected light is incident, and the rear surface of the second mirror 521B may be the reflective component 531 that is stacked on the lens component 532.

Note that the lens component 532 which transmits and condenses the reflected light is not limited to a Fresnel lens; the lens component 532 may be a microlens array.

In the above embodiments, the laser scanner is described as being used as a rangefinder for measuring the distance between the laser scanner and the target object 20, but the laser scanner is not limited to this example. For example, the laser scanner may be used as a sensor for discriminating shapes of target objects transported on a conveyer.

The scanning mirror described above may be manufactured by being cut or etched, or manufactured using an imprint lithography technique, such as nanoimprint lithography or glass imprint lithography.

The laser scanner according to the present invention may be realized by combining any of the above-described embodiments.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The laser scanner according to the present invention is applicable as, for example, a laser rangefinder for measuring the distance between the laser scanner and a target object, or a sensor for discriminating shapes of target objects transported on a conveyer.

The invention claimed is:

1. A laser scanner for scanning laser light toward a target object, the laser scanner comprising:
   a light source that emits laser light;
   a scanning mirror that scans the laser light from the light source toward the target object by oscillating about a predetermined axis, and reflects the laser light reflected from the target object, the scanning mirror having a plate shape, and having a first surface and a second surface parallel with the first surface; and
   a photodetector that receives, via the scanning mirror, the laser light reflected from the target object,
   wherein the scanning mirror includes:
   a first reflective surface that scans the laser light from the light source by reflecting the laser light from the light source;
   a second reflective surface that reflects, toward the photodetector, the laser light reflected from the target object; and
   an inner wall defining an opening through which the laser light from the light source passes, the laser light passing through from a first surface side of the scanning mirror to an opposing second surface side of the scanning mirror,
   wherein the first reflective surface and at least part of the second reflective surface are disposed at mutually different angles,
   wherein when (i) a first optical axis passing through the target object and the first reflective surface is parallel with (ii) a second optical axis passing through the target object and the second reflective surface, (iii) a third optical axis passing through the first reflective surface and the light source and (iv) a fourth optical axis passing through the second reflective surface and the photodetector are at a predetermined angle relative to one another,
   wherein the first reflective surface is formed on the inner wall defining the opening, reflects the laser light entering the opening from the light source, and scans the reflected laser light out of the opening toward the target object, and
   the second reflective surface is formed on the second surface of the scanning mirror and reflects, toward the photodetector, the laser light reflected from the target object.

2. The laser scanner according to claim 1, wherein the first optical axis and the second optical axis are coincident.

3. The laser scanner according to claim 1, wherein in a plan view of the scanning mirror, a region defined by the first reflective surface is included within a region defined by the second reflective surface.

4. The laser scanner according to claim 1, wherein the first reflective surface is disposed along the predetermined axis.

5. The laser scanner according to claim 1, wherein the opening is a notch extending from an edge of the scanning mirror, in a direction substantially perpendicular to a thickness direction of the scanning mirror, and
the first reflective surface is formed on the inner wall defining the notch, at a base of the notch.

6. The laser scanner according to claim 1, wherein the first reflective surface is substantially perpendicular to the second reflective surface.

7. The laser scanner according to claim 1, wherein
the opening is an aperture formed through the thickness of the scanning mirror, and
the first reflective surface is formed on the inner wall defining the aperture.

8. The laser scanner according to claim 7, wherein
the first reflective surface is oblique to the second reflective surface.

9. The laser scanner according to claim 7, wherein
the aperture has an area on the first surface side of the scanning mirror that is greater than an area of the aperture on the second surface side of the scanning mirror.

10. The laser scanner according to claim 1, wherein
the scanning mirror includes, on the first surface side, a low-reflection surface having a lower reflectivity than the first reflective surface and the second reflective surface.

11. The laser scanner according to claim 1, wherein
the opening has a width that is greater than or equal to a diameter of the laser light from the light source.

12. A laser scanner for scanning laser light toward a target object, the laser scanner comprising:
a light source that emits laser light;
a scanning mirror that scans the laser light from the light source toward the target object by oscillating about a predetermined axis, and reflects the laser light reflected from the target object; and
a photodetector that receives, via the scanning mirror, the laser light reflected from the target object,
wherein the scanning mirror includes:
a first reflective surface that scans the laser light from the light source by reflecting the laser light from the light source;
a second reflective surface that reflects and condenses, toward the photodetector, the laser light reflected from the target object;
a reflective component that reflects the laser light reflected from the target object; and
a lens component that is stacked on the reflective component, and transmits and condenses the laser light,
wherein the first reflective surface and at least part of the second reflective surface are disposed at mutually different angles,
wherein when (i) a first optical axis passing through the target object and the first reflective surface is parallel with (ii) a second optical axis passing through the target object and the second reflective surface, (iii) a third optical axis passing through the first reflective surface and the light source and (iv) a fourth optical axis passing through the second reflective surface and the photodetector are at a predetermined angle relative to one another, and
wherein the second reflective surface is an interface between the reflective component and the lens component.

13. The laser scanner according to claim 12, wherein
the first reflective surface is disposed along an optical axis of the second reflective surface, and
the first reflective surface is oblique to a plane perpendicular to the optical axis of the second reflective surface.

14. The laser scanner according to claim 12, wherein
the second reflective surface surrounds the first reflective surface.

15. The laser scanner according to claim 12, wherein
the scanning mirror has a substantially planar surface opposing the second reflective surface, the substantially planar surface being perpendicular to an optical axis of the second reflective surface, and
the optical axis of the second reflective surface intersects the predetermined axis.

16. The laser scanner according to claim 12, wherein
the scanning mirror includes a protrusion that protrudes outward from the second reflective surface, and
the first reflective surface is at least part of a surface formed by the protrusion.

17. The laser scanner according to claim 1, wherein
the center of mass of the scanning mirror is disposed along the predetermined axis.

* * * * *